(12) United States Patent
Hu

(10) Patent No.: US 8,111,666 B2
(45) Date of Patent: Feb. 7, 2012

(54) METHOD AND SYSTEM FOR IDLE MODE SIGNALING REDUCTION

(75) Inventor: Weihua Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/618,177

(22) Filed: Nov. 13, 2009

(65) Prior Publication Data

US 2010/0064038 A1    Mar. 11, 2010

Related U.S. Application Data

(63) Continuation of application No. PCT/CN2008/073865, filed on Dec. 30, 2008.

(30) Foreign Application Priority Data

Jan. 30, 2008  (CN) .......................... 2008 1 0008444
Mar. 19, 2008  (CN) .......................... 2008 1 0087515

(51) Int. Cl.
*H04W 36/00* (2009.01)

(52) U.S. Cl. ....................................... 370/331; 455/436

(58) Field of Classification Search .......... 709/220–222, 709/227
See application file for complete search history.

(56) References Cited

U.S. PATENT DOCUMENTS

| 6,078,571 | A | 6/2000 | Hall |
| 6,438,370 | B1 | 8/2002 | Einola et al. |
| 6,771,964 | B1 | 8/2004 | Einola et al. |
| 6,909,899 | B2 | 6/2005 | Wang et al. |
| 6,993,334 | B2 | 1/2006 | Andrus et al. |
| 7,089,008 | B1 | 8/2006 | Bäck et al. |
| 7,181,218 | B2 | 2/2007 | Ovesjo et al. |
| 7,558,226 | B2 | 7/2009 | Anderson et al. |
| 7,660,585 | B2 | 2/2010 | Bäck et al. |
| 7,855,991 | B2 * | 12/2010 | Hu ................. 370/331 |
| 2002/0160785 | A1 | 10/2002 | Ovesjo et al. |
| 2003/0171117 | A1 | 9/2003 | Wang et al. |
| 2004/0029587 | A1 | 2/2004 | Hulkkonen et al. |
| 2005/0165951 | A1 | 7/2005 | Wang et al. |
| 2006/0109817 | A1 | 5/2006 | Ramanna et al. |
| 2006/0109818 | A1 | 5/2006 | Ramanna et al. |
| 2006/0126564 | A1 | 6/2006 | Ramanna et al. |
| 2006/0268782 | A1 | 11/2006 | Kwak et al. |

(Continued)

FOREIGN PATENT DOCUMENTS

CN         1568039 A       1/2005

(Continued)

OTHER PUBLICATIONS

3rd generation Partnership Project: Technical Specification Group Services and System Aspects, 3GPP TS 23.401 V8.0.0, Dec. 2007, 167 pages.*

(Continued)

*Primary Examiner* — Hussein A. Elchanti
(74) *Attorney, Agent, or Firm* — Slater & Matsil, L.L.P.

(57) ABSTRACT

A method and a system for idle mode signaling reduction (ISR) are provided. The method includes: obtaining ISR activation information of a source network, and setting an ISR status of an user equipment (UE) in a target network according to the obtained ISR activation information of the source network. Thus, the ISR status of the UE can be processed when the UE is handed over between networks.

26 Claims, 22 Drawing Sheets

U.S. PATENT DOCUMENTS

| | | | |
|---|---|---|---|
| 2007/0293224 | A1 | 12/2007 | Wang et al. |
| 2008/0102837 | A1 | 5/2008 | Li et al. |
| 2008/0170548 | A1 | 7/2008 | Suh et al. |
| 2008/0176569 | A1 | 7/2008 | Jung et al. |
| 2009/0073933 | A1 | 3/2009 | Madour et al. |
| 2009/0268687 | A1 | 10/2009 | Lee et al. |

FOREIGN PATENT DOCUMENTS

| | | |
|---|---|---|
| CN | 1893721 A | 1/2007 |
| CN | 1984452 A | 6/2007 |
| CN | 101014168 A | 8/2007 |
| CN | 101282582 A | 10/2008 |

OTHER PUBLICATIONS

International Search Report and Written Opinion, issued in corresponding PCT Patent Application No. PCT/CN2008/073865, dated Apr. 2, 2009.

Extended European Search Report issued in corresponding European Patent Application No. 08872192.3, mailed Oct. 19, 2010.

"3$^{rd}$ Generation Partnership Project: Technical Specification Group Services and System Aspects; General Packet Radio Service (GPRS) enhancements for Evolved Universal Terrestrial Radio Access Network (E-UTRAN) access (Release 8)", 3GPP TS 23.401 V8.0.0, Dec. 2007, 167 pages.

Zte, Catt, 3GPP TSG SA WG2 Meeting #61. ISR Activation—Agenda Item 8.2.8. Ljubljana, Slovenia, Nov. 12-16, 2007.

Huawei, 3GPP TSG-SA2 Meeting #62. CR on TAU/RAU with ISR. 23.401 CR 0028 v 8.0.0. Marina Del Rey, USA, Jan. 14-18, 2008.

Revised Accelerated Examination Support Document, filed Oct. 7, 2010, U.S. Appl. No. 12/837,160, 109 pages.

Supplemental Accelerated Examination Support Document, filed Nov. 5, 2010, U.S. Appl. No. 12/837,160, 14 pages.

"ISR activation," SA WG2 Temporary Document, 3GPP TSG SA WG2 Meeting # 61, TD S2-074968, Nov. 12-16, 2007, pp. 1-7.

Second Chinese Office Action, Application No. 200810087515.4, Date of mailing: Feb. 1, 2011, 18 pages.

Third Chinese Office Action, Application No. 200810087515.4, Date of mailing: May 25, 2011, 14 pages.

Third Chinese Office Action, Application No. 200910211729.2, Date of mailing: Sep. 23, 2011, 21 pages.

Communication pursuant to Article 94(3) EPC, Application No. 08 872 192.3—2413, dated Nov. 21, 2011, 5 pages.

3GPP TSG CT WG4 Meeting #38, C4-080108, "Basic functionality for S10 interface," Source: Huawei, Agenda item: 6.1.1.2, Jan. 28—Feb. 1, 2008, Puerto Vallarta, Mexico, 8 pages.

* cited by examiner

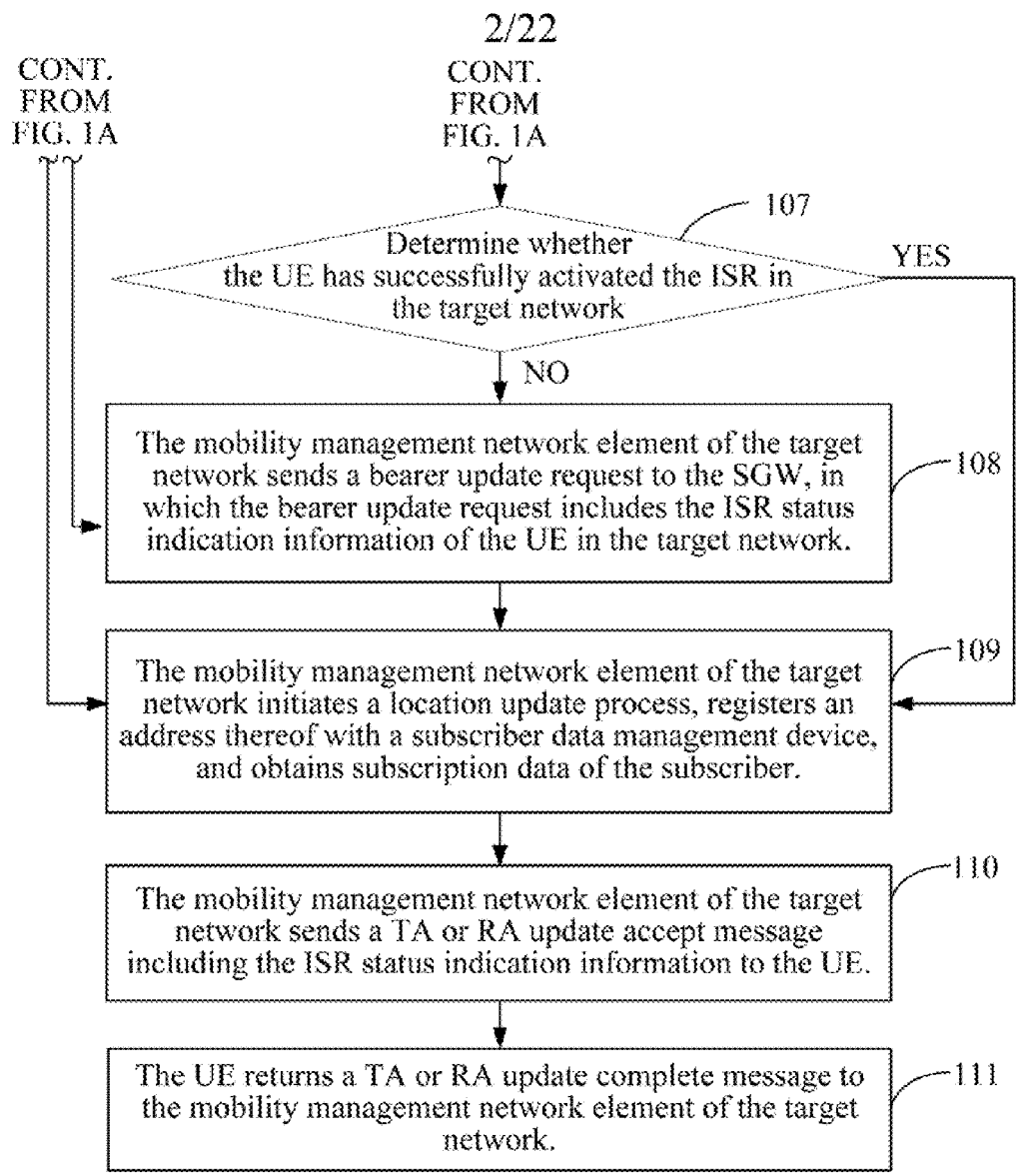

METHOD AND SYSTEM FOR IDLE MODE SIGNALING REDUCTION

CROSS-REFERENCE TO RELATED APPLICATIONS

This application is a continuation of International Application No. PCT/CN2008/073865, filed on Dec. 30, 2008, which claims priority to Chinese Patent Application No. 200810008444.4, filed on Jan. 30, 2008 and Chinese Patent Application No. 200810087515.4, filed on Mar. 19, 2008, all of which are hereby incorporated by reference in their entireties.

FIELD OF THE INVENTION

The present invention relates to the field of communication technology, and more particularly to a method and a system for idle mode signaling reduction (ISR).

BACKGROUND OF THE INVENTION

In areas where different Third Generation Partnership Project (3GPP) access networks overlap or are adjacent to one another, when a subscriber changes an access system, for example, changes from a GSM/EDGE Radio Access Network/UMTS Terrestrial Radio Access Network (GERAN/UTRAN) to an Evolved UMTS Terrestrial Radio Access Network (EUTRAN), or from the EUTRAN to the GERAN/UTRAN, the subscriber needs to initiate a location update process, which brings certain load to the core network and air interfaces. In order to avoid such signaling load and to optimize the mobility management mechanism among different 3GPP access systems, the 3GPP has proposed an ISR mechanism in an idle mode, which aims at reducing the signaling load caused by the mobility management process of a user equipment (UE) among different access networks. The UE is registered with a serving general packet radio service support node (SGSN) and a mobility management entity (MME) in sequence, and then the ISR is enabled. Thus, as long as the UE does not leave the Routing Area (RA) and Tracking Area (TA) where it is located at the time of registering with the SGSN and MME, the UE does not need to initiate the location update process. Thus, even though a mobile subscriber is frequently handed over between a 2G/3G cell and a Long Term Evolution (LTE) cell, no signaling load will be generated. In addition, even if the RA or TA where the subscriber is located is changed, as long as the SGSN and MME where the subscriber is registered are not changed, the TA or RA update process initiated by the UE does not need to re-register the SGSN or MME on a Home Subscriber Server (HSS). Furthermore, in order to ensure that the MT (Mobile Terminated) service of the subscriber is not influenced, a Serving Gateway (SGW) needs to mark subscribers with the ISR enabled. When receiving downlink data or signaling of such a subscriber, the SGW notifies both the SGSN and the MME to initiate paging at the same time, thereby ensuring that the subscriber can be paged.

In the implementation of the present invention, the inventors found at least the following problem in the prior art, that is, when the UE is handed over between networks, the ISR status of the UE cannot be processed.

SUMMARY OF THE INVENTION

Various embodiments of the present invention are directed to a method and a system for processing ISR in a handover process, which are applicable to process an ISR status of a UE when the UE is handed over between networks.

To achieve the above objective, the present invention provides the following technical solutions.

One embodiment of the present invention provides a method for ISR. The method includes the following steps.

ISR activation information of a source network is obtained.

An ISR status of a UE in a target network is set according to the obtained ISR activation information of the source network.

One embodiment of the present invention further provides a method for ISR. The method includes the following steps.

If a mobility management network element of a target network has an ISR capability, it is determined whether to activate an ISR of a UE in the target network according to an ISR capability or an ISR activation status of a source network, and if the source network supports the ISR or has activated the ISR, the ISR of the UE in the target network is activated.

One embodiment of the present invention further provides a system for ISR. The system includes a mobility management network element of a target network and a serving gateway (SGW) of the target network.

The mobility management network element of the target network is configured to obtain ISR activation information of a source network, and set an ISR status of a UE in the target network according to the obtained ISR activation information of the source network.

The SGW of the target network is configured to record the ISR status of the UE in the target network set by the mobility management network element of the target network.

One embodiment of the present invention provides a mobility management network element, which includes an obtaining unit and a setting unit.

The obtaining unit is configured to obtain ISR activation information of a source network.

The setting unit is configured to set an ISR status of a UE in a target network according to the ISR activation information of the source network obtained by the obtaining unit.

One embodiment of the present invention provides a mobility management network element, which includes a determining unit and an activating unit.

The determining unit is configured to determine whether to activate an ISR of a UE in a target network according to an ISR capability or an ISR activation status of a source network when the mobility management network element of the target network has the ISR capability.

The activating unit is configured to activate the ISR of the UE in the target network when the determining unit determines that the source network has the ISR capability or has activated the ISR.

Through the method and the system for ISR in the embodiments of the present invention, the ISR status of the UE in the target network can be set according to the ISR activation information of the source network or the ISR capability of the mobility management network element of the target network. Thus, when the UE is handed over between networks, the ISR status of the UE can be processed.

BRIEF DESCRIPTION OF THE DRAWINGS

FIG. 1A-1B is a flow chart of a method for ISR according to a first embodiment of the present invention;

DETAILED DESCRIPTION OF THE EMBODIMENTS

In the embodiments, the present invention provides a method and a system for ISR. To make the technical solutions of the present invention more comprehensible, the present invention is described in detail with reference to the accompanying drawings and embodiments as follows.

Figure 1A:
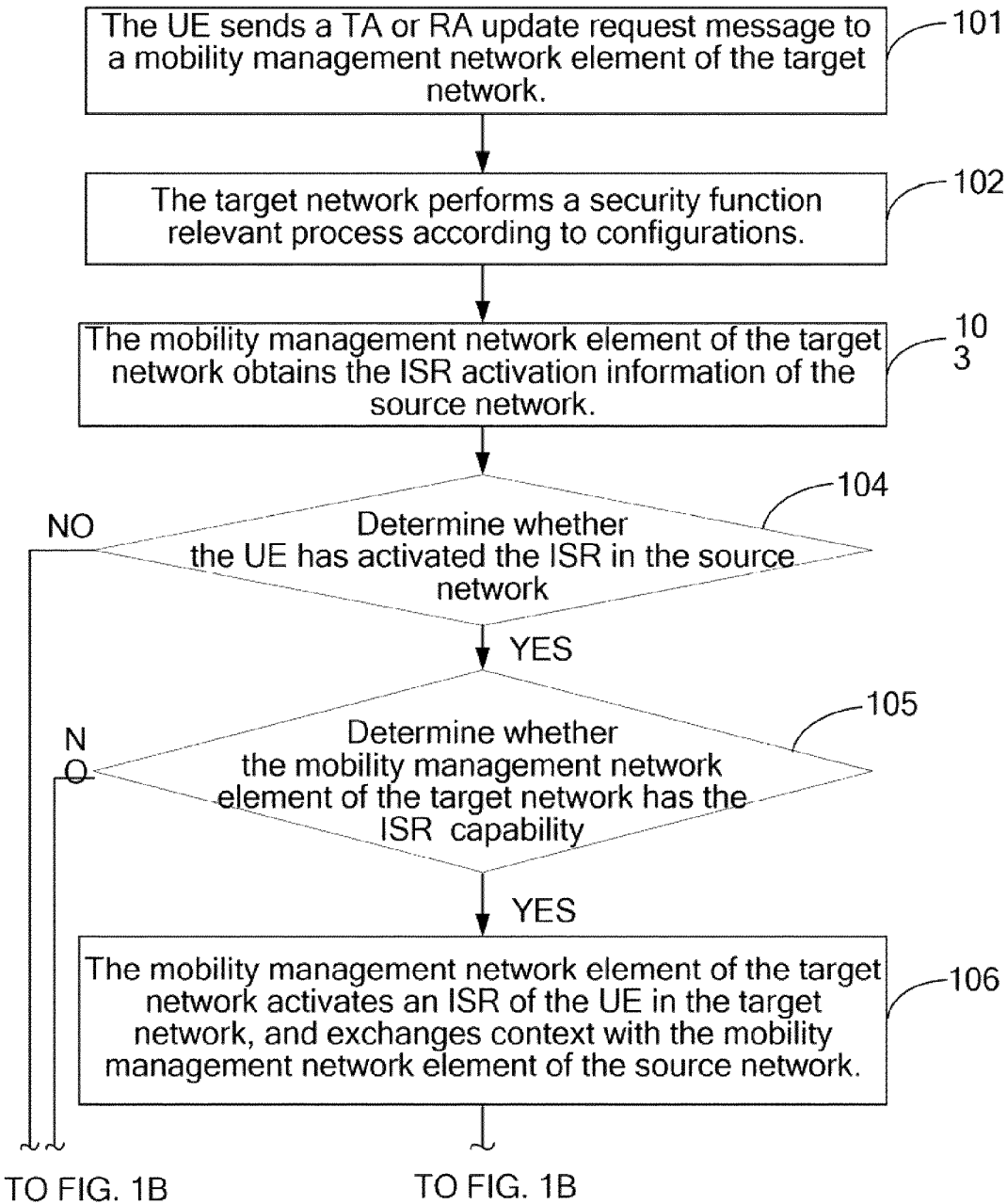

FIG. 1 is a flow chart of a method for ISR according to a first embodiment of the present invention. Referring to FIG. 1, in this embodiment, when an ISR of a UE has been activated in a source network, it is supported to maintain the ISR activation status of the UE after the UE is handed over to a target network.

In a handover process before an RA or TA update process, when a mobility management network element of the target network sends a bearer update request to a SGW of the target network, if the mobility management network element of the target network has an ISR capability, it includes information indicating the SGW to maintain the current ISR status of the subscriber in the bearer update request message, and the SGW maintains the current ISR status of the subscriber according to the indication information.

A specific ISR process in the RA or TA update procedure includes the following steps.

In Step 101, the UE sends a TA or RA update request message to the mobility management network element of the target network.

The TA or RA update request message sent by the UE may include ISR activation information of a source network.

In this embodiment, the ISR activation information of the source network may be a temporary identity of the subscriber or ISR status indication information.

In Step 102, the target network performs a security function relevant process according to configurations.

In Step 103, the mobility management network element of the target network obtains the ISR activation information of the source network.

The mobility management network element of the target network may obtain the ISR activation information of the source network from the TA or RA update request message.

Alternatively, when the security process is performed, the mobility management network element of the target network interacts with that of the source network using the same access technology, so as to obtain the ISR activation information of the source network while obtaining security vectors.

In Step 104, the mobility management network element of the target network determines whether the UE has activated the ISR in the source network; if yes, Step 105 is performed; otherwise, Step 109 is performed.

The mobility management network element of the target network determines whether the UE has activated the ISR in the source network in the following modes.

Mode 1: The mobility management network element of the target network determines whether the TA or RA update request message sent by the UE or a response message including the security vector sent by the mobility management network element of the source network includes the temporary identities assigned to the subscriber by networks based on different access technologies; if yes, the mobility management network element of the target network determines that the UE has activated the ISR in the source network; otherwise, the mobility management network element of the target network determines that the UE has not activated the ISR in the source network.

The UE with the ISR activated includes both temporary identities assigned to the subscriber by the mobility management network elements in two networks based on different access technologies in the request message, or the mobility management network element of the source network includes such both temporary identities in the response message including the security vectors for being sent to the mobility management network element of the target network. For example, the temporary identities include an S-TMSI (assigned by an MME in an EPS network) and a P-TMSI (assigned by an SGSN in a 2G or 3G network), or a TAI (a TA identity in the EPS network) and an RAI (an RA identity in the 2G or 3G network).

Mode 2: The mobility management network element of the target network determines whether the TA or RA update request message sent by the UE or a response message including the security vectors sent by the mobility management network element of the source network includes the ISR status indication information indicating that the ISR status has been activated; if yes, the mobility management network element of the target network determines that the UE has activated the ISR in the source network; otherwise, the mobility management network element of the target network determines that the UE has not activated the ISR in the source network.

In Step 105, the mobility management network element of the target network determines whether the mobility management network element of the target network has the ISR capability; if yes, Step 106 is performed; otherwise, Step 108 is performed.

In Step 106, the mobility management network element of the target network activates an ISR of the UE in the target network, and the mobility management network element of the target network interacts with the mobility management network element of the source network and exchanges about the respective ISR status indication information thereof.

Specifically, this step is described as follows.

1. The mobility management network element of the target network queries a domain name server (DNS) according to the TA identity or RA identity in the request message of the subscriber, obtains an address of a mobility management network element using a different access technology in the source network, and sends a context request to the mobility management network element in the source network.

If the handover before the TA or RA update process is a handover between different access technologies, the target network can directly use the address of the mobility management network element of the source network in the handover process. Alternatively, if the target network has obtained the address of the mobility management network element using a different access technology in the source network during the handover, that is, the mobility management network element using the same access technology in the source network includes such information in a forward handover request message sent to the mobility management network element of the target network, the target network may also directly use the address of the mobility management network element using the different access technology in the source network. Alternatively, when the security process is performed, the mobility management network element of the target network may interact with the mobility management network element using the same access technology in the source network to obtain the address of the mobility management network element using the different access technology at the source side along with the security vectors, and the target network directly uses the address.

2. The mobility management network element using the different access technology in the source network returns a context response message.

3. The mobility management network element of the target network returns a context acknowledgement message to the mobility management network element using the different access technology in the source network, in which the context acknowledgement message includes indication information indicating that the ISR of the UE in the target network has been activated.

The interaction process described in Steps 1 to 3 above is only one implementation, and the interaction in other modes may also be used to achieve the same objective. In addition, when the mobility management network element using the different access technology in the source network is not required to establish an association with the mobility management network element of the target network, Steps 1 to 3 may be omitted.

In Step 107, the mobility management network element of the target network determines whether the UE has successfully activated the ISR in the target network; if yes, Step 109 is performed; otherwise, Step 108 is performed.

In Step 108, the mobility management network element of the target network sends a bearer update request to the SGW, in which the bearer update request includes the ISR status indication information of the UE in the target network.

Specifically, the bearer update request sent by the mobility management network element of the target network may include the indication information indicating the ISR status of the UE in the target network to the SGW; alternatively, the bearer update request includes the corresponding ISR activation indication information only when the ISR status of the UE in the target network is activated, and otherwise, the request does not include the information. Thus, the SGW considers that the ISR status of the UE in the target network is activated only when the request includes the ISR activation indication information and the ISR activation indication information indicates that the ISR status of the UE is activated.

In Step 109, the mobility management network element of the target network initiates a location update process, registers an address thereof with a subscriber data management device, and obtains subscription data of the subscriber.

In Step 110, the mobility management network element of the target network sends a TA or RA update accept message including the ISR status indication information to the UE.

In Step 111, the UE returns a TA or RA update complete message to the mobility management network element of the target network.

The RA update is applicable to the situation that the target network is the 2G/3G network and the mobility management network element of the target network is the SGSN, and the TA update is applicable to the situation that the target network is the LTE network and the mobility management network element of the target network is the MME.

Figure 2A:
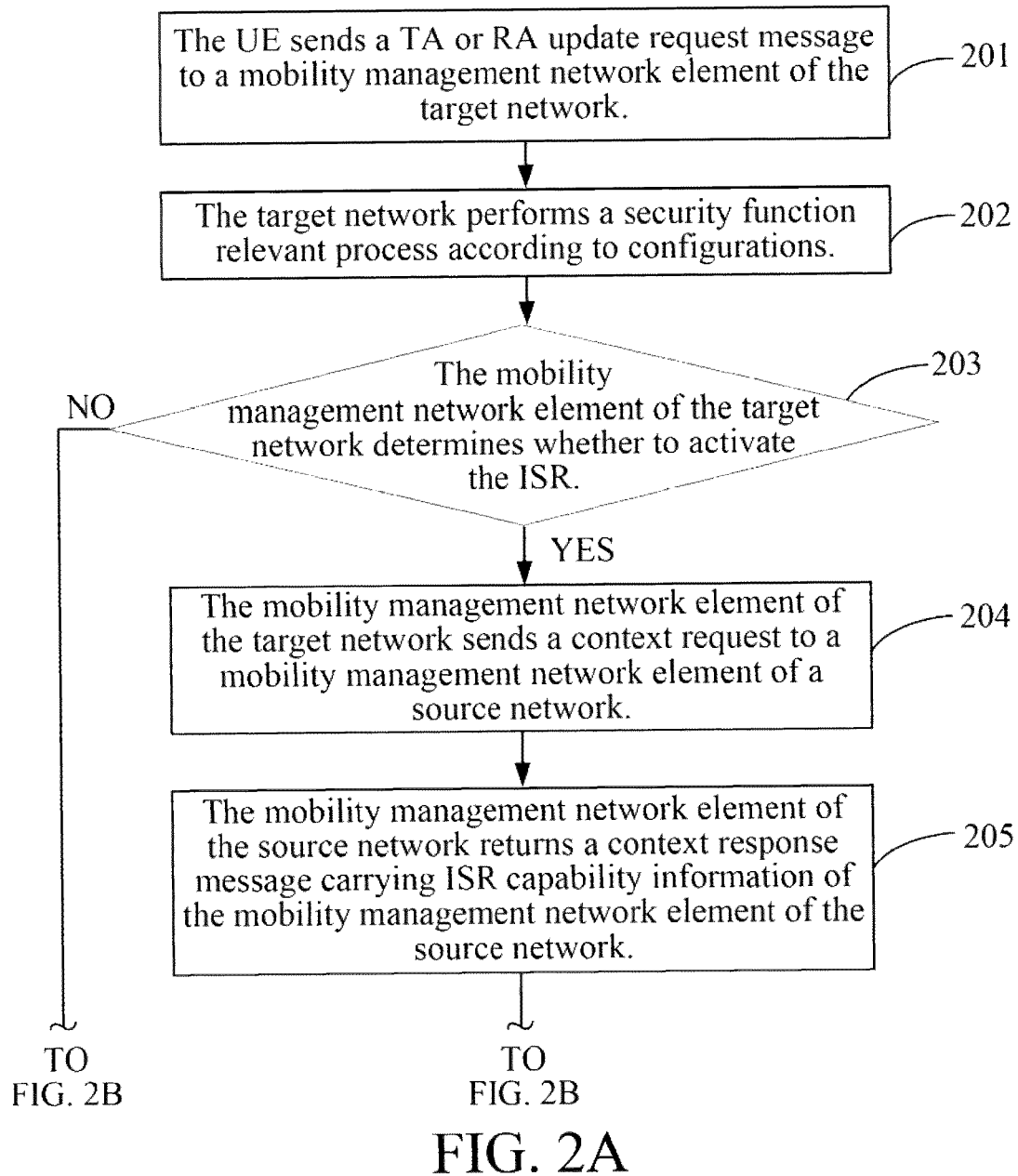
FIG. 2A-2B is a flow chart of a method for ISR according to a second embodiment of the present invention.
Figure 2B:
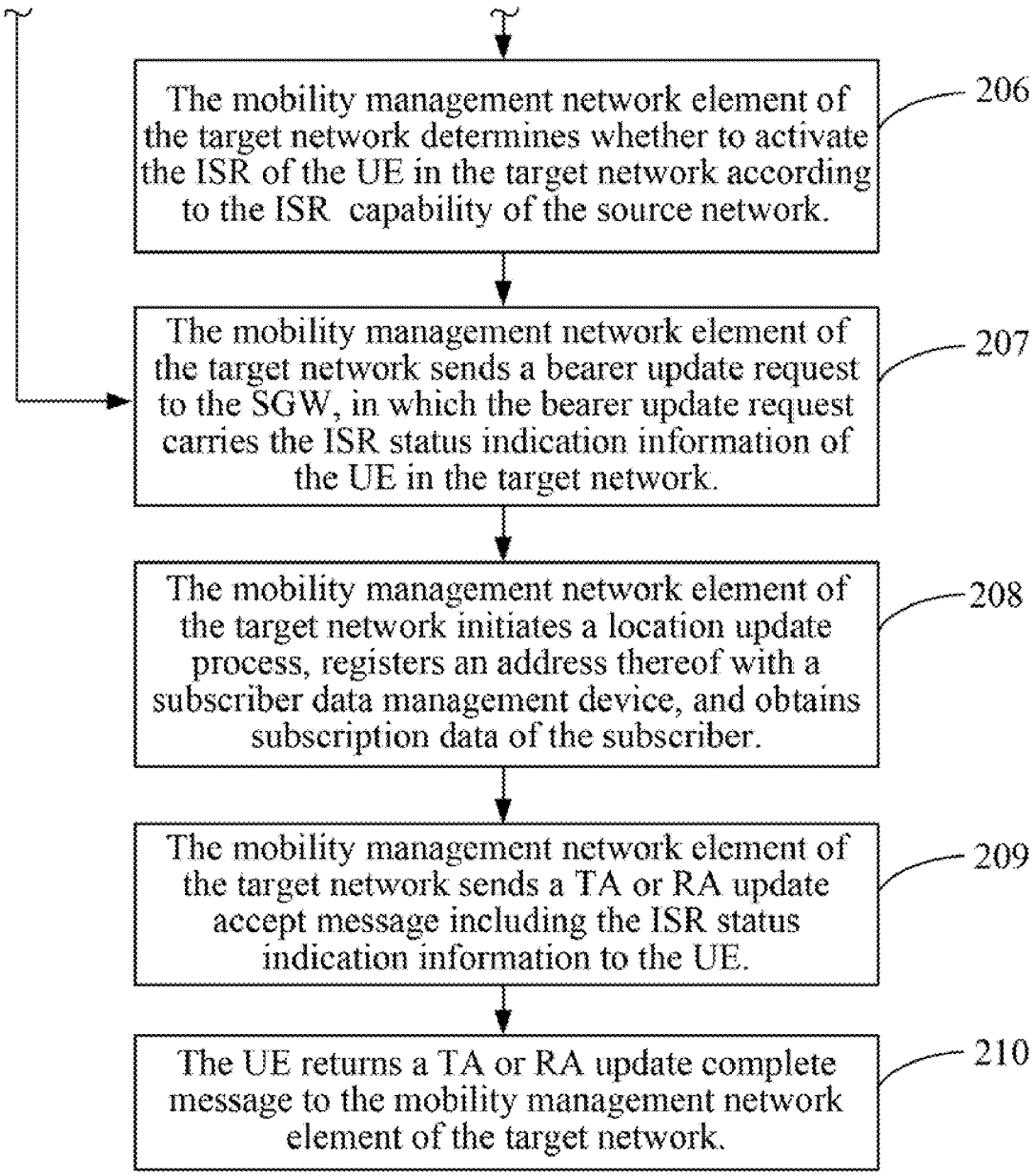

FIG. 2 is a flow chart of a method for ISR according to a second embodiment of the present invention. In this embodiment, if a source network and a target network both have ISR capability, a UE can activate an ISR after being handed over to the target network no matter whether the UE has activated the ISR in the source network.

In a handover process before an RA or TA update process, when a mobility management network element of a target network sends a bearer update request to an SGW of the target network, if the mobility management network element of the target network has the ISR capability, through the request message, the mobility management network element of the target network instructs the SGW not to deactivate the ISR that has been activated; in addition, when the ISR is not activated currently, the bearer context information of an access technology side using an access technology different from the current access technology is not overwritten, that is, if the bearer context information of different access technologies exists, both bearer contexts of the two access technologies are reserved at the same time.

A specific ISR process in the RA or TA update procedure includes the following steps.

In Step 201, the UE sends a TA or RA update request message to the mobility management network element of the target network.

In Step 202, the target network performs a security function relevant process according to configurations.

In Step 203, the mobility management network element of the target network determines whether it has an ISR capability; if yes, Step 204 is performed; otherwise, Step 207 is performed.

In Step 204, the mobility management network element of the target network sends a context request message to a mobility management network element using a different access technology in a source network.

Before the mobility management network element of the target network sends the context request message to the mobility management network element using the different access technology in the source network, the following process is further included.

The mobility management network element of the target network queries a DNS according to the TA identity or RA identity in the request message of the subscriber, obtains an address of the mobility management network element using the different access technology in the source network, and sends a context request to the mobility management network element in the source network.

If the handover before the TA or RA update process is a handover between different access technologies, the target network can directly use the address of the mobility management network element using the different access technology in the source network during the handover process. Alternatively, if the target network has obtained the address of the mobility management network element using the different access technology in the source network during the handover, that is, the mobility management network element using the same access technology in the source network includes such information in a forward handover request message sent to the mobility management network element of the target network, the target network may also directly use the address of the mobility management network element using the different access technology in the source network. Alternatively, when the security process is performed, the mobility management network element of the target network may interact with the mobility management network element using the same access technology in the source network to obtain the address of the mobility management network element using the different access technology at the source side along with the security vectors, and the target network directly uses the address.

In Step 205, the mobility management network element using the different access technology in the source network returns a context response message including ISR capability information of the mobility management network element using the different access technology in the source network.

In Step 206, the mobility management network element of the target network determines whether to activate the ISR of the UE in the target network according to the ISR capability of the source network.

The interaction described in Steps 204-206 is only one implementation, and the interaction in other modes may also be used to achieve the same objective.

In Step 207, the mobility management network element of the target network sends a bearer update request to the SGW, in which the bearer update request includes the ISR status indication information of the UE in the target network.

Specifically, the bearer update request sent by the mobility management network element of the target network may include the indication information indicating the ISR status of the UE in the target network to the SGW; alternatively, the bearer update request includes the corresponding ISR activation indication information only when the ISR status of the UE in the target network is activated, and otherwise, the request does not include the information. Thus, the SGW considers that the ISR status of the UE in the target network is activated only when the request includes the ISR activation indication information and the ISR activation indication information indicates that the ISR status of the UE is activated.

In Step 208, the mobility management network element of the target network initiates a location update process, registers an address thereof with a subscriber data management device, and obtains subscription data of the subscriber.

In Step 209, the mobility management network element of the target network sends a TA or RA update accept message including the ISR status indication information to the UE.

In Step 210, the UE returns a TA or RA update complete message to the mobility management network element of the target network.

Figure 3A:
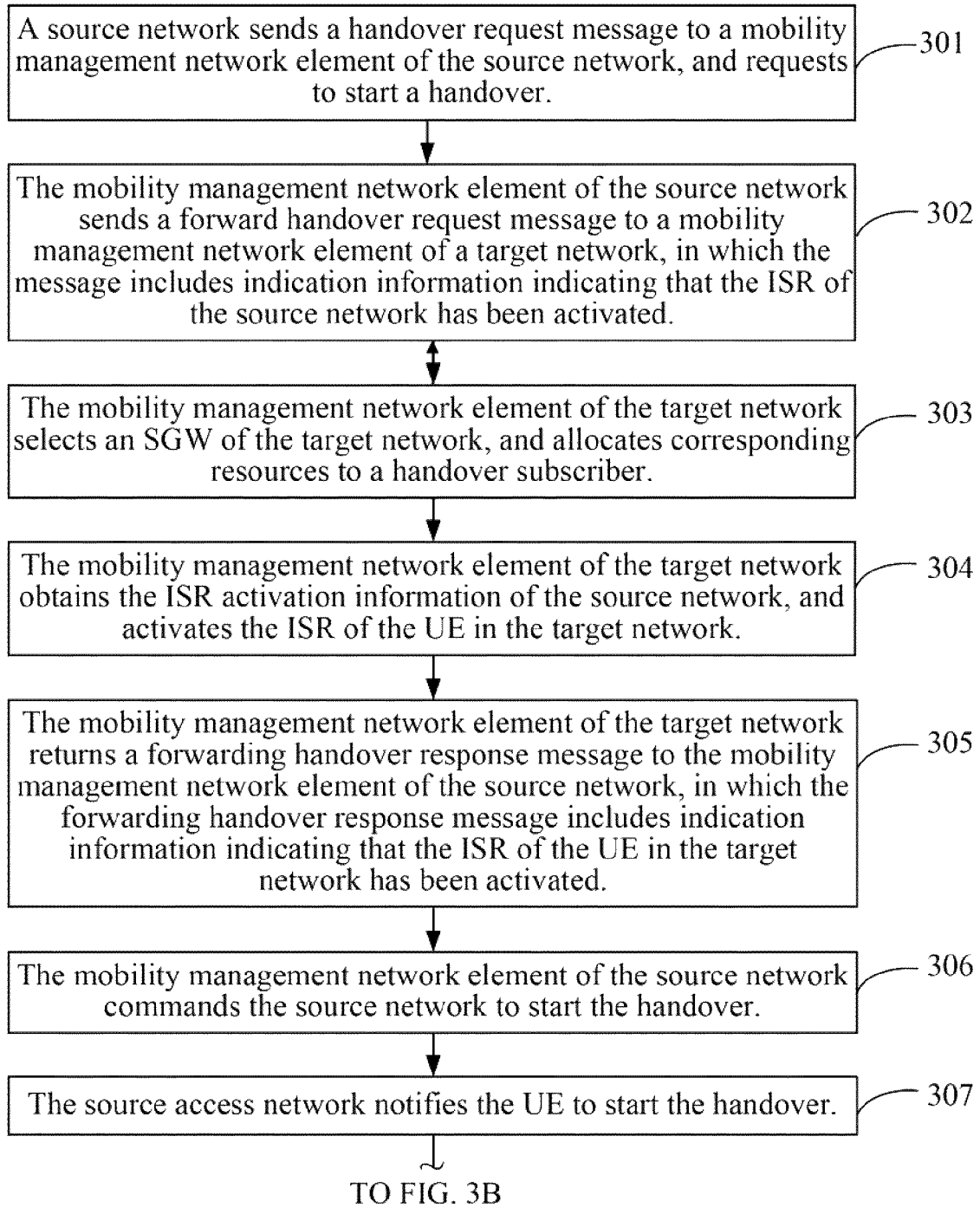
FIG. 3A-3B is a flow chart of a method for ISR according to a third embodiment of the present invention.
Figure 3B:
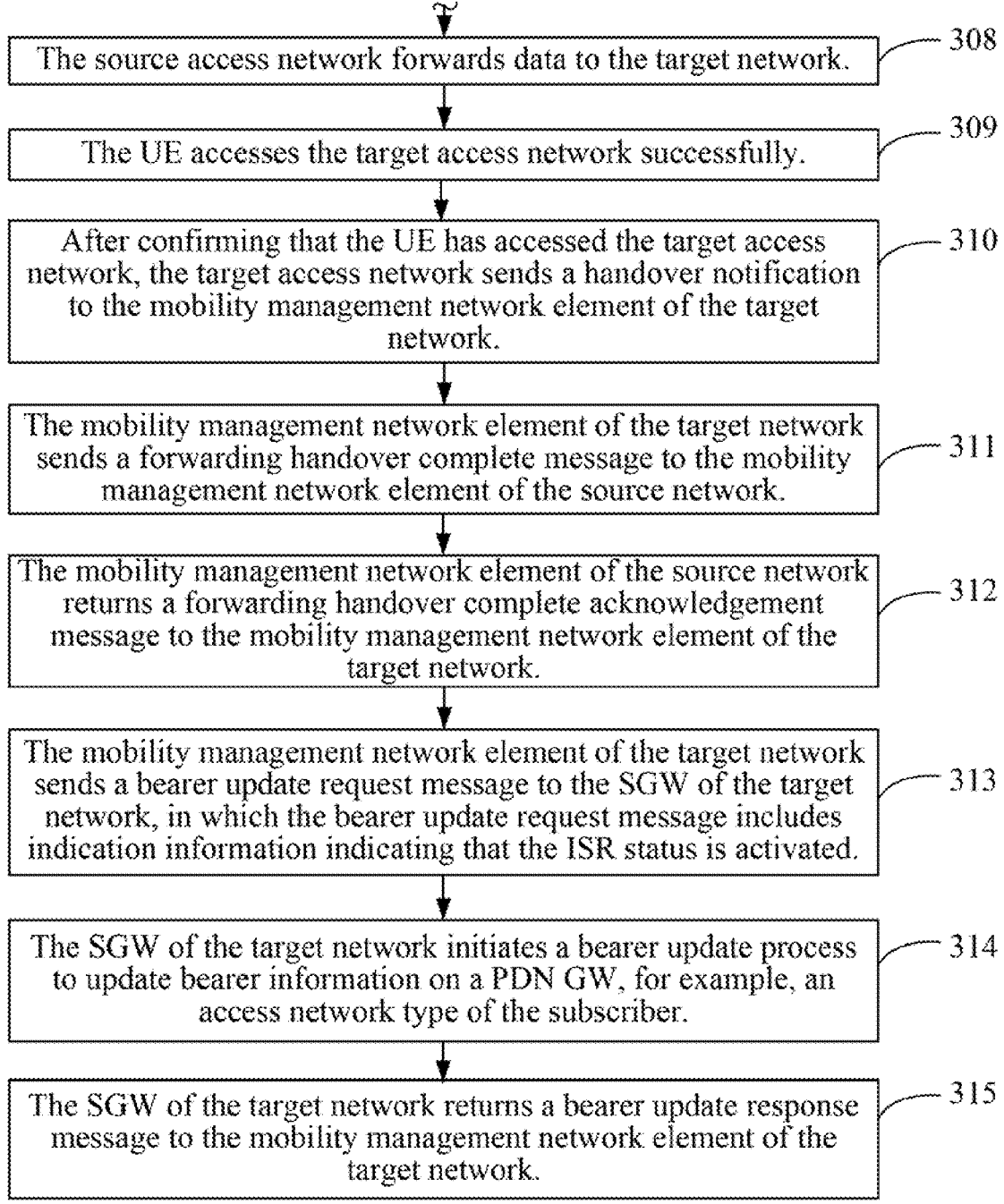

FIG. 3 is a flow chart of a method for ISR according to a third embodiment of the present invention. Referring to FIG. 3, in this embodiment, a UE is handed over between networks using different 3GPP access technologies. Furthermore, in this embodiment, it is supported to maintain an ISR activation status of the UE after the UE is handed over to a target network only when an ISR of the UE is activated in a source network.

A specific ISR process in a handover procedure is described as follows.

In Step 301, a source network sends a handover request message to a mobility management network element of the source network, and requests to start a handover, in which the handover request message includes a bearer context to be forwarded.

In Step 302, the mobility management network element of the source network selects a mobility management network element of a target network, and sends a forward handover request message to the mobility management network element of the target network, in which the message includes ISR activation information of the source network.

In this embodiment, the ISR activation information of the source network is indication information indicating that an ISR status of the UE is activated in the source network.

In Step 303, the mobility management network element of the target network selects an SGW of the target network, and allocates corresponding bearer resources and data forwarding resources to a handover subscriber.

In Step 304, the mobility management network element of the target network obtains the ISR activation information of the source network from the forward handover request message, and determines to activate the ISR of the UE in the target network.

In Step 305, the mobility management network element of the target network returns a forwarding handover response message to the mobility management network element of the source network, in which the forwarding handover response message includes indication information indicating that the ISR status of the UE in the target network is activated.

In Step 306, the mobility management network element of the source network commands the source network to start the handover.

In Step 307, the source access network notifies the UE to start the handover.

In Step 308, the source access network starts to forward data to the target network.

In Step 309, the UE accesses the target access network successfully.

In Step 310, after confirming that the UE has accessed the target access network, the target access network sends a handover notification to the mobility management network element of the target network.

In Step 311, the mobility management network element of the target network sends a forwarding handover complete message to the mobility management network element of the source network.

In Step 312, the mobility management network element of the source network returns a forwarding handover complete acknowledgement message to the mobility management network element of the target network.

In Step 313, the mobility management network element of the target network sends a bearer update request message to the SGW of the target network to update user plane bearer information, in which the bearer update request message includes indication information indicating that the ISR status is activated.

In Step 314, the SGW of the target network initiates a bearer update process to update bearer information on a PDN GW, for example, an access network type of the subscriber.

In Step 315, the SGW of the target network returns a bearer update response message to the mobility management network element of the target network.

In the RA or TA update process after the handover process, the mobility management network element of the target network includes indication information indicating that the ISR status is activated in a TA or RA update accept response message delivered to the UE.

In this embodiment, the mobility management network element may be an MME or an SGSN.

Figure 4A:
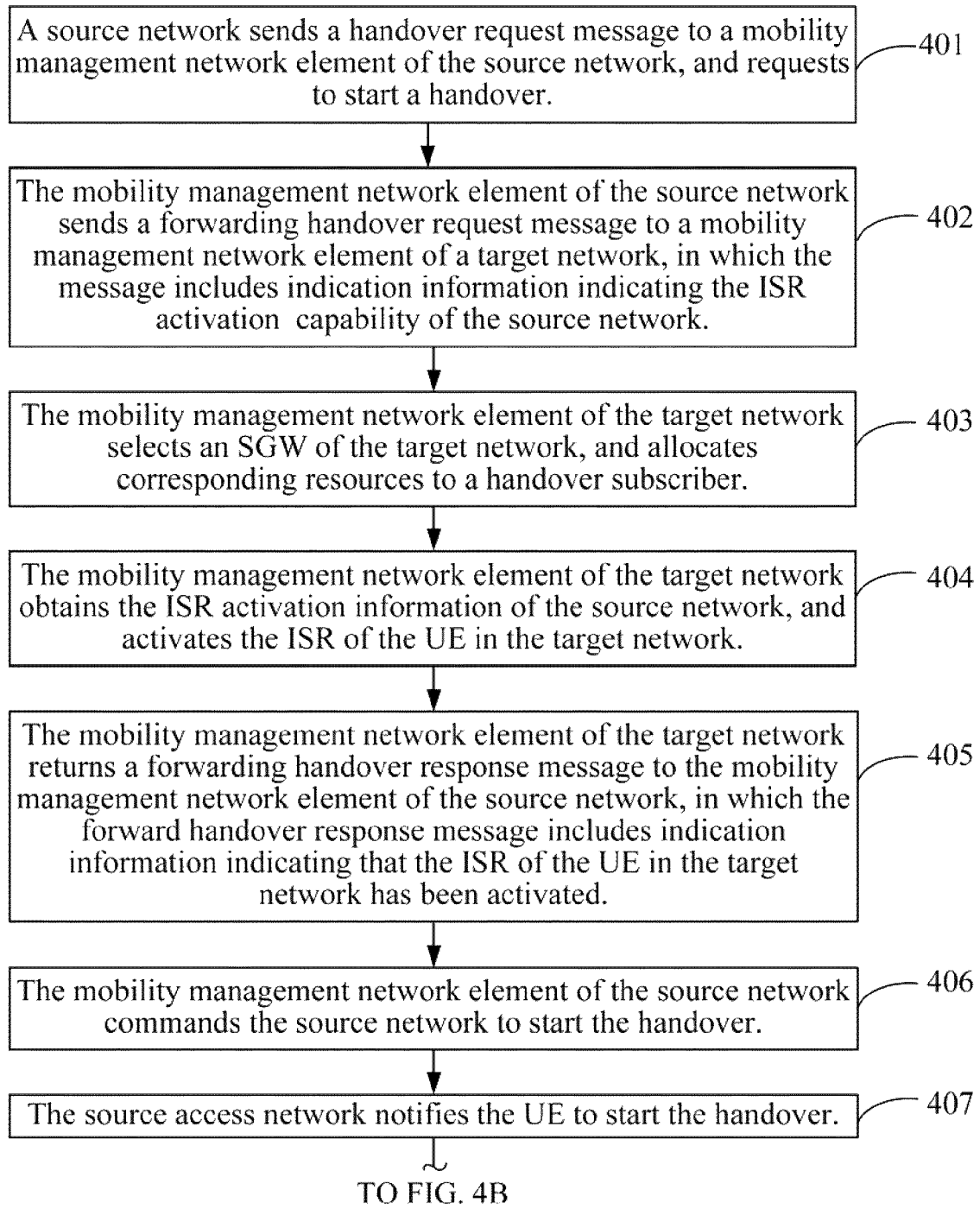
FIG. 4A-4B is a flow chart of a method for ISR according to a fourth embodiment of the present invention.
Figure 4B:
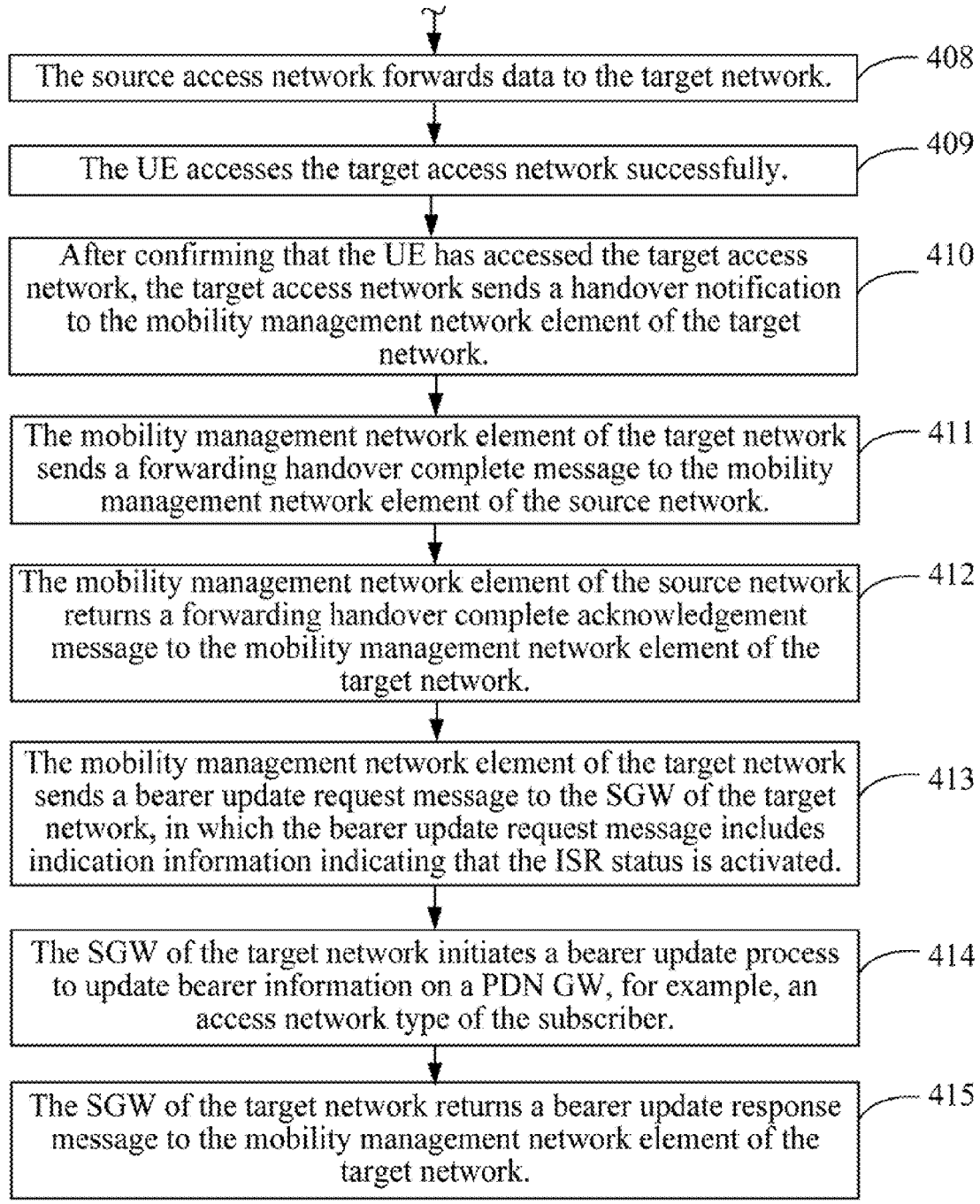

FIG. 4 is a flow chart of a method for ISR according to a fourth embodiment of the present invention. Referring to FIG. 4, in this embodiment, a UE is handed over between networks using different 3GPP access technologies. In this embodiment, if a source network and a target network both have an ISR capability, it is supported that the UE can activate an ISR after being handed over to the target network no matter whether the UE has activated the ISR in the source network.

A specific ISR process in a handover procedure is described as follows.

In Step 401, the source network sends a handover request message to a mobility management network element of the source network, and requests to start a handover, in which the handover request message includes a bearer context to be forwarded.

In Step 402, the mobility management network element of the source network selects a mobility management network element of the target network, and sends a forward handover request message to the mobility management network element of the target network, in which the message includes ISR activation information of the source network.

In this embodiment, the ISR activation information of the source network is indication information indicating that the UE has an ISR activation support capability in the source network.

In Step 403, the mobility management network element of the target network selects an SGW of the target network, and allocates corresponding bearer resources and data forwarding resources to a handover subscriber.

In Step 404, the mobility management network element of the target network obtains the ISR activation information of the source network from the forward handover request message, and determines to activate the ISR of the UE in the target network.

In Step 405, the mobility management network element of the target network returns a forwarding handover response message to the mobility management network element of the source network, in which the forwarding handover response message includes indication information indicating that the ISR status of the UE in the target network is activated.

In Step 406, the mobility management network element of the source network commands the source network to start the handover.

In Step 407, the source access network notifies the UE to start the handover.

In Step 408, the source access network starts to forward data to the target network.

In Step 409, the UE accesses the target access network successfully.

In Step 410, after confirming that the UE has accessed the target access network, the target access network sends a handover notification to the mobility management network element of the target network.

In Step 411, the mobility management network element of the target network sends a forwarding handover complete message to the mobility management network element of the source network.

In Step 412, the mobility management network element of the source network returns a forwarding handover complete acknowledgement message to the mobility management network element of the target network.

In Step 413, the mobility management network element of the target network sends a bearer update request message to the SGW of the target network to update user plane bearer information, in which the bearer update request message includes indication information indicating that the ISR status is activated.

In Step 414, the SGW of the target network initiates a bearer update process to update bearer information on a PDN GW, for example, an access network type of the subscriber.

In Step 415, the SGW of the target network returns a bearer update response message to the mobility management network element of the target network.

In the RA or TA update process after the handover process, the mobility management network element of the target network includes indication information indicating that the ISR status is activated in a TA or RA update accept response message delivered to the UE.

Figure 5A:
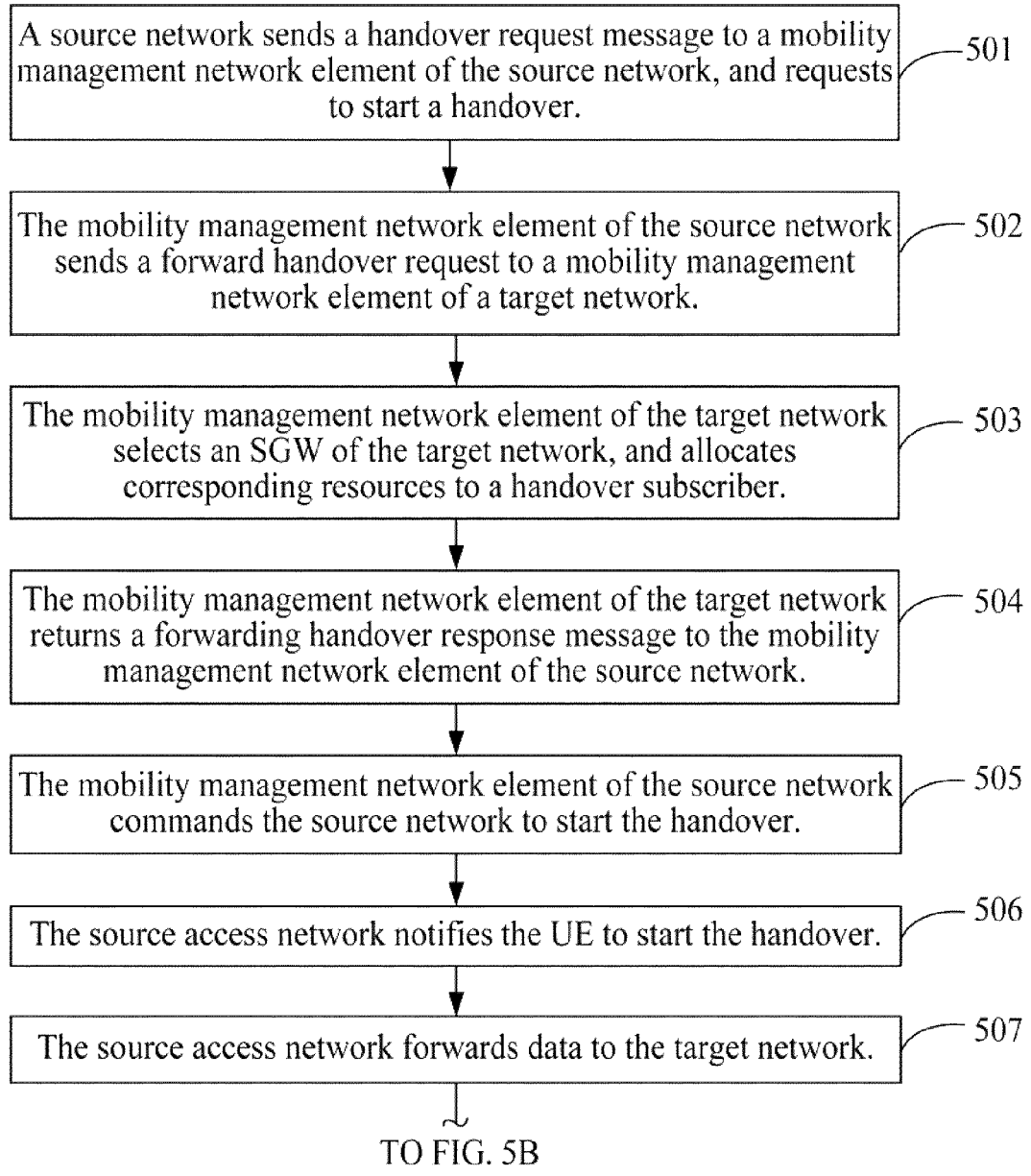
FIG. 5A-5B is a flow chart of a method for ISR according to a fifth embodiment of the present invention.
Figure 5B:
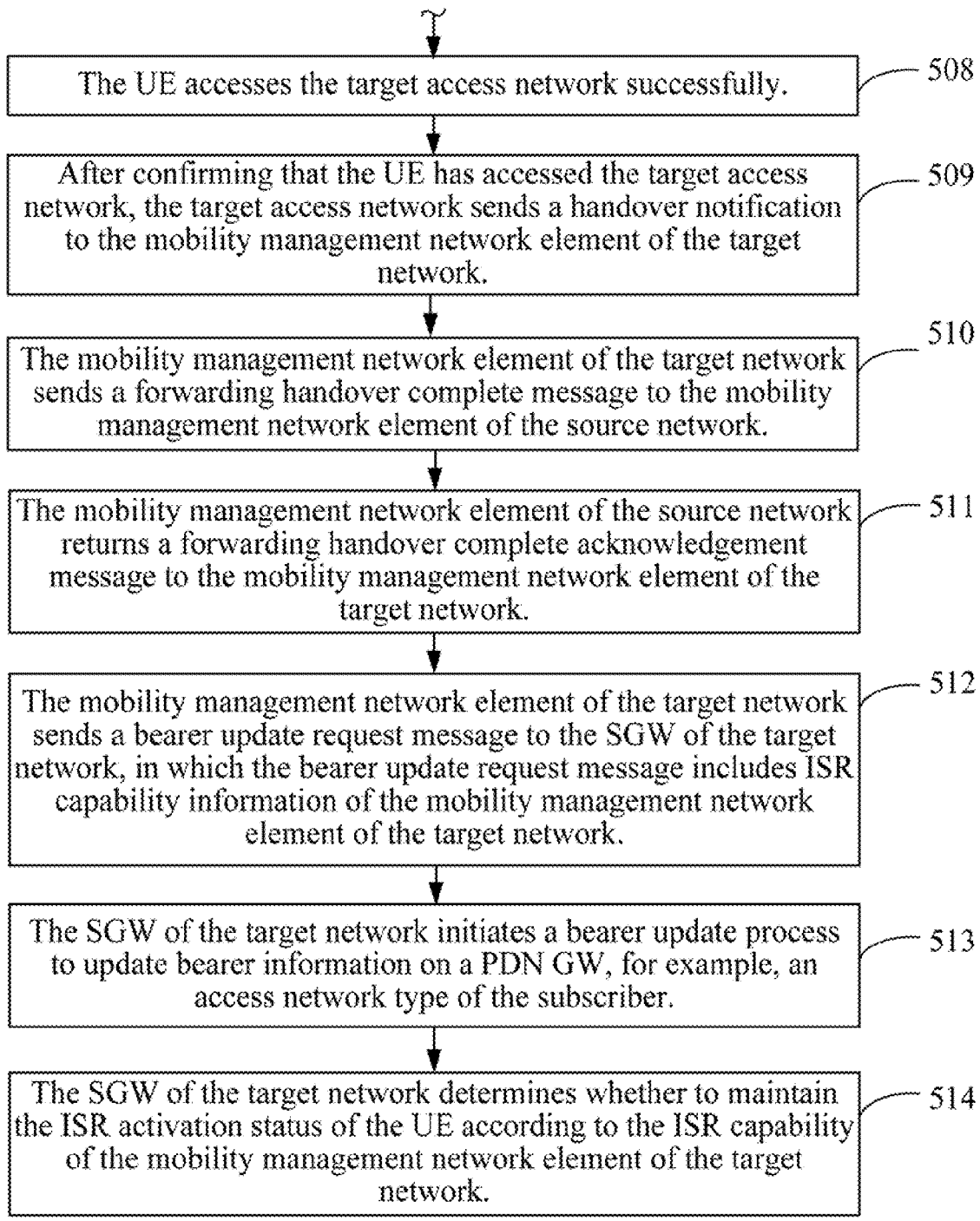

FIG. 5 is a flow chart of a method for ISR according to a fifth embodiment of the present invention. In this embodiment, the ISR mechanism does not require to establish an association between a mobility management network element of a source network and a mobility management network element of a target network. Furthermore, in this embodiment, it is supported to maintain an ISR activation status of a UE after the UE is handed over to the target network when an ISR of the UE is activated in the source network.

A specific ISR process in a handover procedure is described as follows.

In Step 501, the source network sends a handover request message to a mobility management network element of the source network, and requests to start a handover, in which the handover request message includes a bearer context to be forwarded.

In Step 502, the mobility management network element of the source network selects a mobility management network element of the target network, and sends a forward handover request message to the mobility management network element of the target network.

In Step 503, the mobility management network element of the target network selects an SGW of the target network, and allocates corresponding bearer resources and data forwarding resources to a handover subscriber.

In Step 504, the mobility management network element of the target network returns a forwarding handover response message to the mobility management network element of the source network.

In Step 505, the mobility management network element of the source network commands the source network to start the handover.

In Step 506, the source access network notifies the UE to start the handover.

In Step 507, the source access network starts to forward data to the target network.

In Step 508, the UE accesses the target access network successfully.

In Step 509, after confirming that the UE has accessed the target access network, the target access network sends a handover notification to the mobility management network element of the target network.

In Step 510, the mobility management network element of the target network sends a forwarding handover complete message to the mobility management network element of the source network.

In Step 511, the mobility management network element of the source network returns a forwarding handover complete acknowledgement message to the mobility management network element of the target network.

In Step 512, the mobility management network element of the target network sends a bearer update request message to the SGW of the target network to update user plane bearer information, in which the bearer update request message includes ISR capability information of the mobility management network element of the target network.

In Step 513, the SGW of the target network initiates a bearer update process to update bearer information on a PDN GW, for example, an access network type of the subscriber.

In Step 514, the SGW of the target network determines whether to maintain the ISR activation status of the UE according to the ISR capability of the mobility management network element of the target network, and returns a bearer update response message to the mobility management network element of the target network. If the ISR is continuously activated, the response message includes the ISR activation indication information.

In the RA or TA update process after the handover process, the mobility management network element of the target network includes the ISR status indication information in a TA or RA update accept response message delivered to the UE.

Figure 6A:
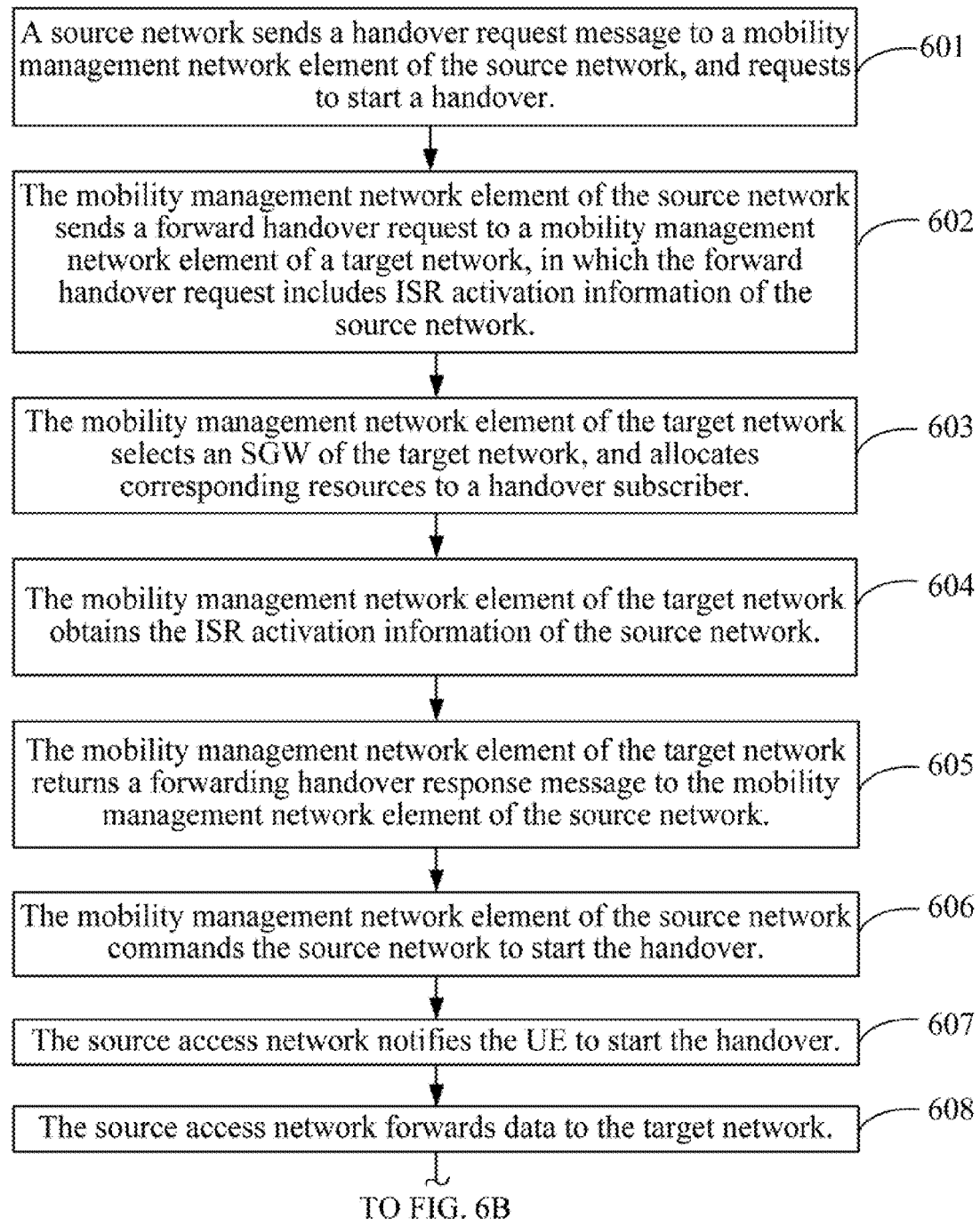
FIG. 6A-6B is a flow chart of a method for ISR according to a sixth embodiment of the present invention.
Figure 6B:
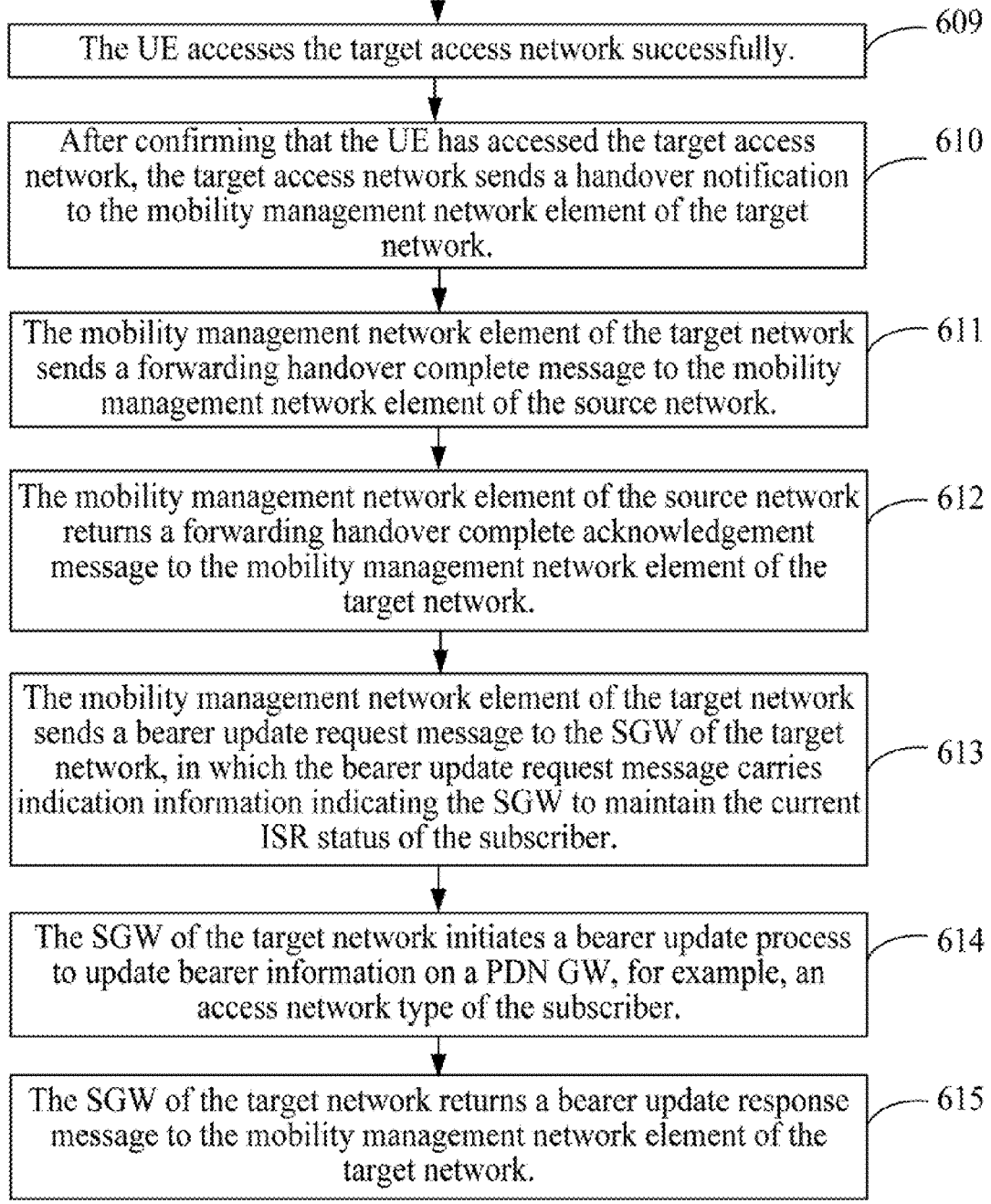

FIG. 6 is a flow chart of a method for ISR according to a sixth embodiment of the present invention.

Referring to FIG. 6, a specific ISR process in a handover procedure is described as follows.

In Step 601, a source network sends a handover request message to a mobility management network element of the source network, and requests to start a handover, in which the handover request message includes a bearer context to be forwarded.

In Step 602, the mobility management network element of the source network selects a mobility management network element of a target network, and sends a forward handover request message to the mobility management network element of the target network, in which the forward handover request message includes ISR activation information of the source network.

In this embodiment, the ISR activation information of the source network may be indication information indicating that an ISR status of a UE in the source network is activated.

In Step 603, the mobility management network element of the target network selects an SGW of the target network, and allocates corresponding bearer resources and data forwarding resources to a handover subscriber.

In Step 604, the mobility management network element of the target network obtains the ISR activation information of the source network from the forward handover request message.

In Step 605, the mobility management network element of the target network returns a forwarding handover response message to the mobility management network element of the source network.

In Step 606, the mobility management network element of the source network commands the source network to start the handover.

In Step 607, the source network notifies the UE to start the handover.

In Step 608, the source network starts to forward data to the target network.

In Step 609, the UE accesses the target network successfully.

In Step 610, after confirming that the UE has accessed the target network, the target network sends a handover notification to the mobility management network element of the target network.

In Step 611, the mobility management network element of the target network sends a forwarding handover complete message to the mobility management network element of the source network.

In Step 612, the mobility management network element of the source network returns a forwarding handover complete acknowledgement message to the mobility management network element of the target network.

In Step 613, the mobility management network element of the target network sends a bearer update request message to the SGW of the target network to update user plane bearer information.

If the mobility management network element of the target network determines to activate the ISR of the UE in the target network, the bearer update request message includes information indicating the SGW to maintain the current ISR status of the subscriber, and the SGW maintains the current ISR status of the subscriber unchanged according to the indication information. Here, the indication may directly instruct the SGW to maintain the ISR status of the subscriber unchanged, or indicate that the current update procedure is a handover procedure to indirectly instruct the SGW to maintain the ISR status of the subscriber unchanged.

In Step 614, the SGW of the target network initiates a bearer update process to update bearer information on a PDN GW, for example, an access network type of the subscriber.

In Step 615, the SGW of the target network returns a bearer update response message to the mobility management network element of the target network.

Figure 7A:
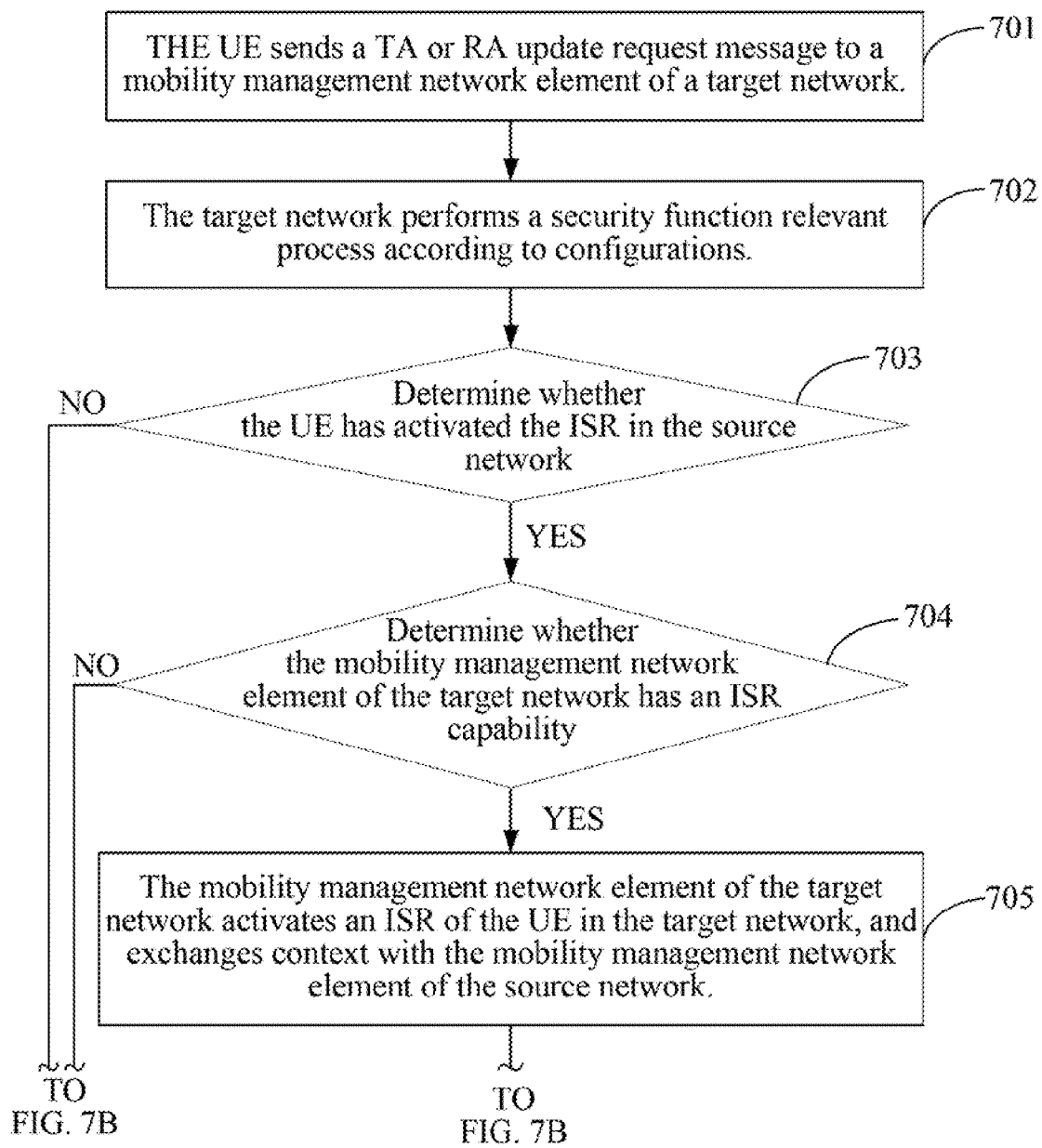
FIG. 7A-7B is a flow chart of a method for ISR according to a seventh embodiment of the present invention.
Figure 7B:
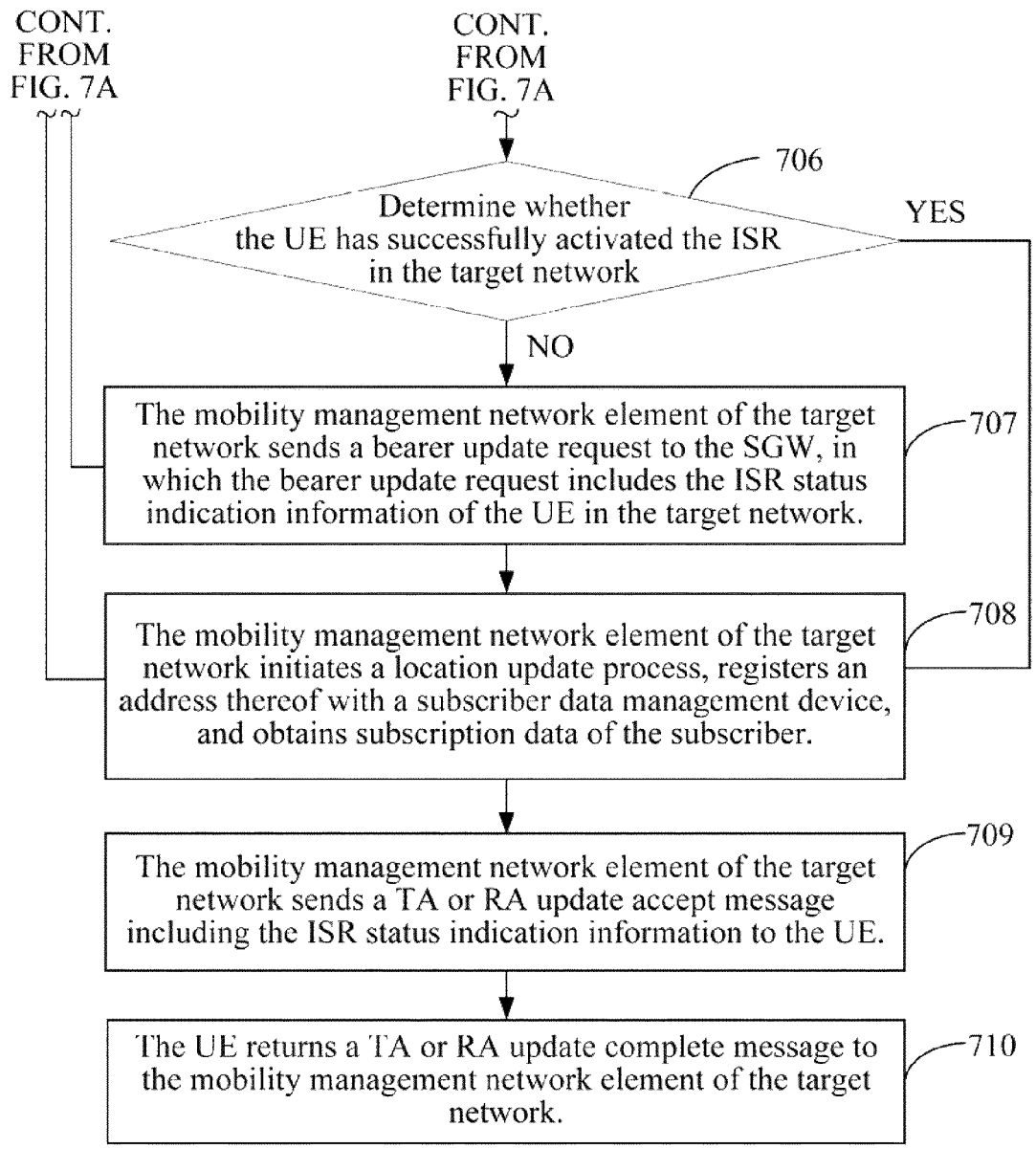

FIG. 7 is a flow chart of a method for ISR according to a seventh embodiment of the present invention.

Referring to FIG. 7, a specific ISR process in an RA or TA update procedure includes the following steps.

In Step 701, a UE sends a TA or RA update request message to a mobility management network element of a target network.

In Step 702, the target network performs a security function relevant process according to configurations.

In Step 703, the mobility management network element of the target network determines whether the UE has activated an ISR in a source network; if yes, Step 704 is performed; otherwise, Step 708 is performed.

In this embodiment, the mobility management network element of the target network determines whether the source network has activated the ISR in the following way.

It is determined whether the source network has activated the ISR by determining whether a forward handover request message sent by a mobility management network element of the source network includes ISR status indication information and whether the ISR status indication information indicates that the ISR status is activated.

In Step 704, the mobility management network element of the target network determines whether the mobility management network element of the target network has an ISR capability; if yes, Step 705 is performed; otherwise, Step 708 is performed.

In Step 705, the mobility management network element of the target network activates an ISR of the UE in the target network, and the mobility management network element of the target network interacts with the mobility management network element of the source network and exchanges about the respective ISR status indication information thereof.

Specifically, this step is described as follows.

1. The mobility management network element of the target network queries a DNS according to the TA identity or RA identity in the request message of the subscriber, obtains an address of a mobility management network element using a different access technology in the source network, and sends a context request to the mobility management network element in the source network.

If the handover before the TA or RA update process is a handover between different access technologies, the target network can directly use the address of the mobility management network element of the source network in the handover process. Alternatively, if the target network has obtained the address of the mobility management network element using the different access technology in the source network during the handover, that is, the mobility management network element using the same access technology in the source network includes such information in a forward handover request message sent to the mobility management network element of the target network, the target network may also directly use the address of the mobility management network element using the different access technology in the source network. Alternatively, when the security process is performed, the mobility management network element of the target network may interact with the mobility management network element using the same access technology in the source network to obtain the address of the mobility management network element using the different access technology at the source side along with security vectors, and the target network directly uses the address.

2. The mobility management network element using the different access technology in the source network returns a context response message.

3. The mobility management network element of the target network returns a context acknowledgement message to the mobility management network element using the different access technology in the source network, in which the context acknowledgement message includes indication information indicating that the ISR of the UE in the target network has been activated.

The interaction process described in Steps 1 to 3 above is only one implementation, and the interaction in other modes may also be used to achieve the same objective. In addition, when the mobility management network element using the different access technology in the source network is not required to establish an association with the mobility management network element of the target network, Steps 1 to 3 may be omitted.

In Step 706, the mobility management network element of the target network determines whether the UE has successfully activated the ISR in the target network; if yes, Step 708 is performed; otherwise, Step 707 is performed.

In Step 707, the mobility management network element of the target network sends a bearer update request to the SGW, in which the bearer update request includes the ISR status indication information of the UE in the target network.

Specifically, the bearer update request sent by the mobility management network element of the target network may include the indication information indicating the ISR status of the UE in the target network to the SGW; alternatively, the bearer update request includes the corresponding ISR activation indication information only when the ISR status of the UE in the target network is activated, and otherwise, the request does not include the information. Thus, the SGW considers that the ISR status of the UE in the target network is activated only when the request includes the ISR activation indication information and the ISR activation indication information indicates that the ISR status of the UE is activated.

In Step 708, the mobility management network element of the target network initiates a location update process, registers an address thereof with a subscriber data management device, and obtains subscription data of the subscriber.

In Step 709, the mobility management network element of the target network sends a TA or RA update accept message including the ISR status indication information to the UE.

In Step 710, the UE returns a TA or RA update complete message to the mobility management network element of the target network.

The RA update is applicable to the situation that the target network is the 2G/3G network and the mobility management network element of the target network is the SGSN, and the TA update is applicable to the situation that the target network is the LTE network and the mobility management network element of the target network is the MME.

Figure 8A:
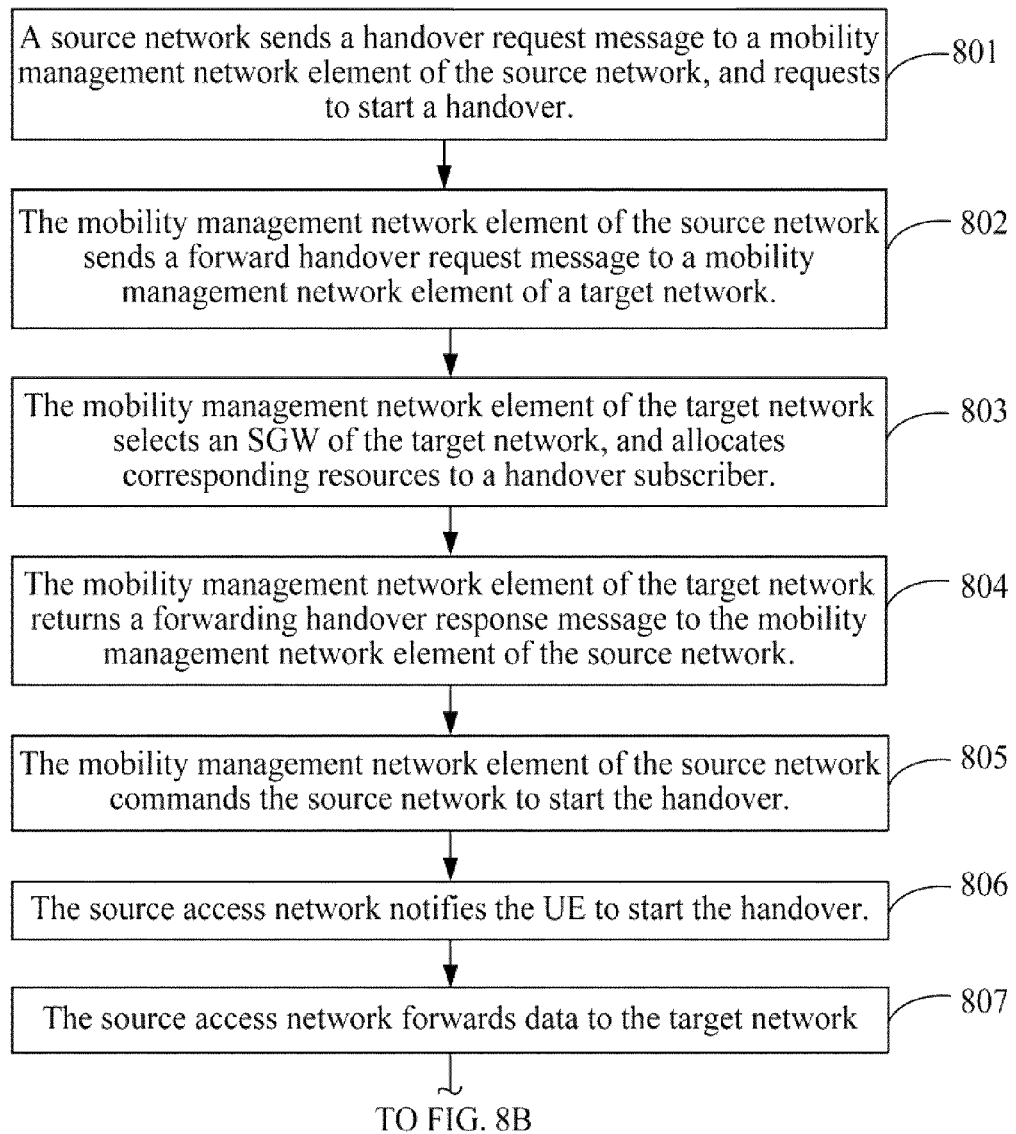
FIG. 8A-8B is a flow chart of a method for ISR according to an eighth embodiment of the present invention.
Figure 8B:
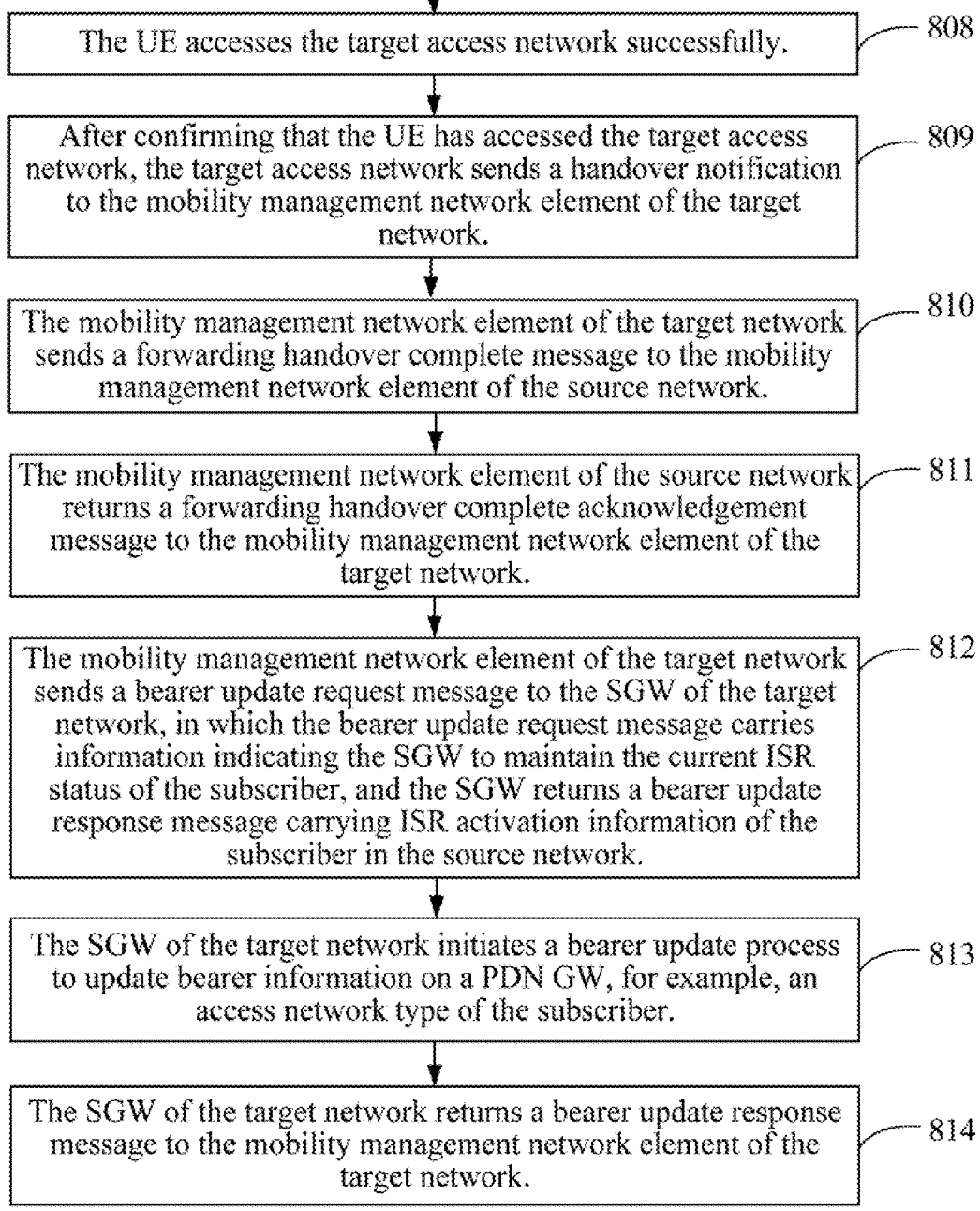

FIG. 8 is a flow chart of a method for ISR according to an eighth embodiment of the present invention. The eighth embodiment is similar to the sixth embodiment described above, but uses a different way to obtain ISR activation information of a source network in a handover process.

Referring to FIG. 8, a specific ISR process in a handover process is described as follows.

In Step 801, a source network sends a handover request message to a mobility management network element of the source network, and requests to start a handover, in which the handover request message includes a bearer context to be forwarded.

In Step 802, the mobility management network element of the source network selects a mobility management network element of a target network, and sends a forward handover request message to the mobility management network element of the target network.

In Step 803, the mobility management network element of the target network selects an SGW of the target network, and allocates corresponding bearer resources and data forwarding resources to a handover subscriber.

In Step 804, the mobility management network element of the target network returns a forwarding handover response message to the mobility management network element of the source network.

In Step 805, the mobility management network element of the source network commands the source network to start the handover.

In Step 806, the source access network notifies the UE to start the handover.

In Step 807, the source access network starts to forward data to the target network.

In Step 808, the UE accesses the target access network successfully.

In Step 809, after confirming that the UE has accessed the target access network, the target access network sends a handover notification to the mobility management network element of the target network.

In Step 810, the mobility management network element of the target network sends a forwarding handover complete message to the mobility management network element of the source network.

In Step 811, the mobility management network element of the source network returns a forwarding handover complete acknowledgement message to the mobility management network element of the target network.

In Step 812, the mobility management network element of the target network sends a bearer update request message to the SGW of the target network to update user plane bearer information.

If the mobility management network element of the target network supports the ISR, the bearer update request message includes information indicating the SGW to maintain the current ISR status of the subscriber or information indicating the SGW that the current process is a handover process. The SGW returns a bearer update response message including ISR activation information of the subscriber in the source network, and further maintains the current ISR status of the subscriber unchanged according to the indication.

In Step 813, the SGW of the target network initiates a bearer update process to update bearer information on a PDN GW, for example, an access network type of the subscriber.

In Step 814, the SGW of the target network returns a bearer update response message to the mobility management network element of the target network.

The RA or TA update process is the same as that described in the above embodiments, and will not be described again here. The only difference lies in that the mobility management network element of the target network determines whether the source network has activated the ISR according to the ISR activation information indication obtained from the source network in Step 812 of the handover process.

Figure 9A:
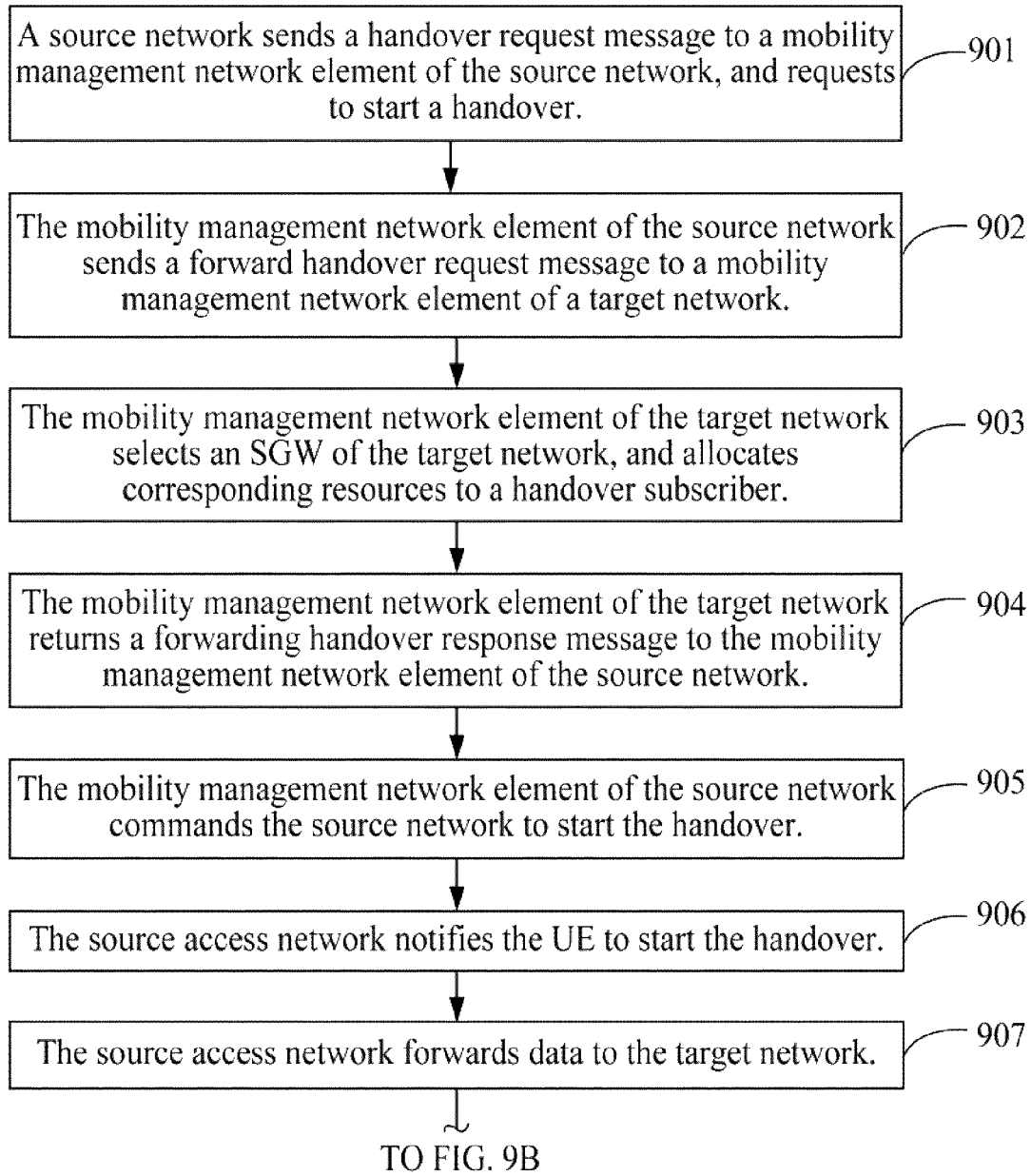
FIG. 9A-9B is a flow chart of a method for ISR according to a ninth embodiment of the present invention.
Figure 9B:
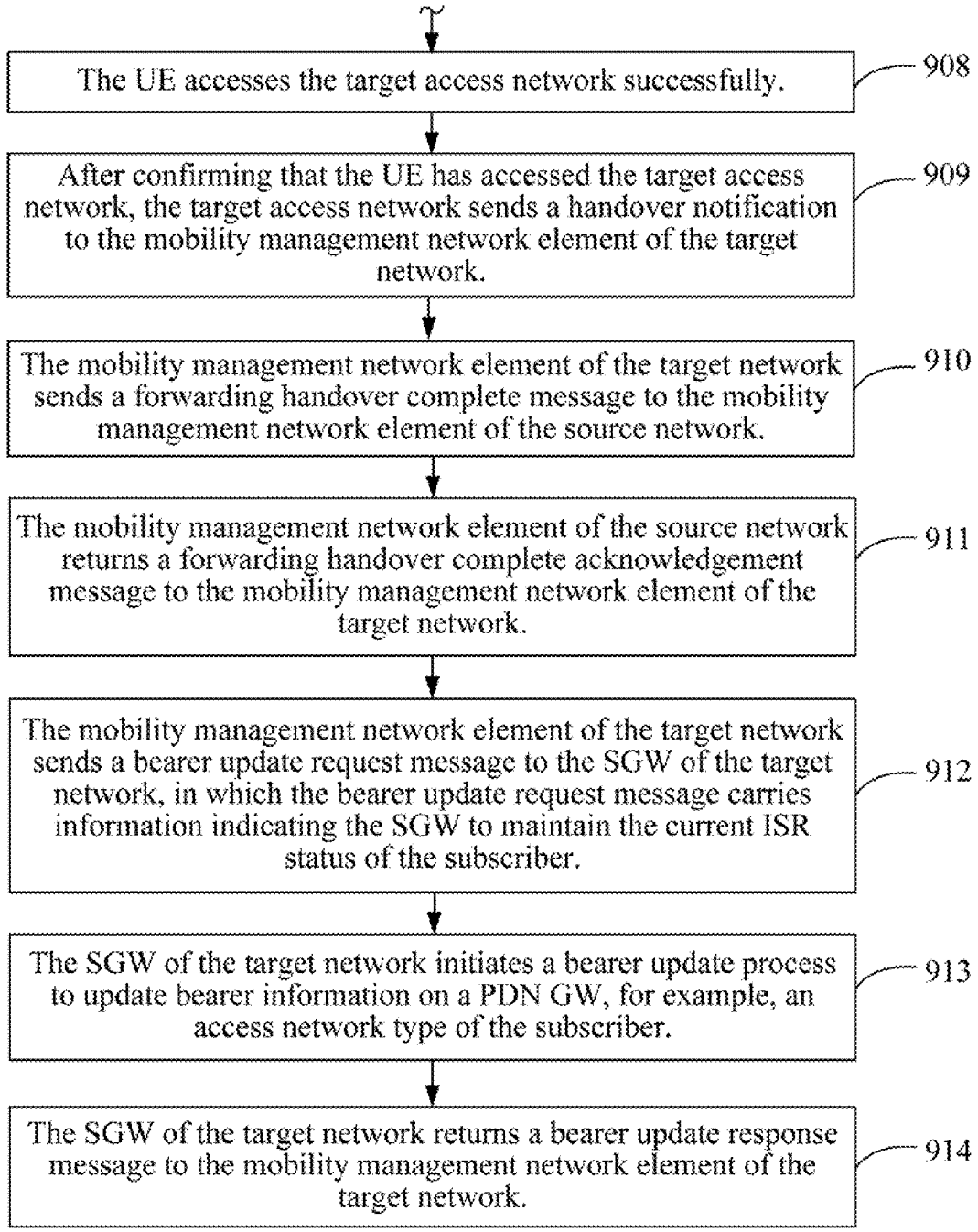

FIG. 9 is a flow chart of a method for ISR according to a ninth embodiment of the present invention. Referring to FIG. 9, in a handover process, a source network is not required to provide ISR activation information of a subscriber in the source network, and as long as a target network supports the ISR, the target network can interact with the source network to activate the ISR.

Referring to FIG. 9, a specific ISR process in a handover procedure is described as follows.

In Step 901, a source network sends a handover request message to a mobility management network element of the source network, and requests to start a handover, in which the handover request message includes a bearer context to be forwarded.

In Step 902, the mobility management network element of the source network selects a mobility management network element of a target network, and sends a forward handover request message to the mobility management network element of the target network.

In Step 903, the mobility management network element of the target network selects an SGW of the target network, and allocates corresponding bearer resources and data forwarding resources to a handover subscriber.

In Step 904, the mobility management network element of the target network returns a forwarding handover response message to the mobility management network element of the source network.

In Step 905, the mobility management network element of the source network commands the source network to start the handover.

In Step 906, the source access network notifies the UE to start the handover.

In Step 907, the source access network starts to forward data to the target network.

In Step 908, the UE accesses the target access network successfully.

In Step 909, after confirming that the UE has accessed the target access network, the target access network sends a handover notification to the mobility management network element of the target network.

In Step 910, the mobility management network element of the target network sends a forwarding handover complete message to the mobility management network element of the source network.

In Step 911, the mobility management network element of the source network returns a forwarding handover complete acknowledgement message to the mobility management network element of the target network.

In Step 912, the mobility management network element of the target network sends a bearer update request message to the SGW of the target network to update user plane bearer information.

If the mobility management network element of the target network supports the ISR, the bearer update request message includes information indicating the SGW to maintain the current ISR status of the subscriber, and the SGW maintains the current ISR status of the subscriber unchanged according to the indication information. (The indication may directly instruct the SGW to maintain the ISR status of the subscriber unchanged, or indicate that the current update process is a handover process to indirectly instruct the SGW to maintain the ISR status of the subscriber unchanged.)

In Step 913, the SGW of the target network initiates a bearer update process to update bearer information on a PDN GW, for example, an access network type of the subscriber.

In Step 914, the SGW of the target network returns a bearer update response message to the mobility management network element of the target network.

Figure 10:
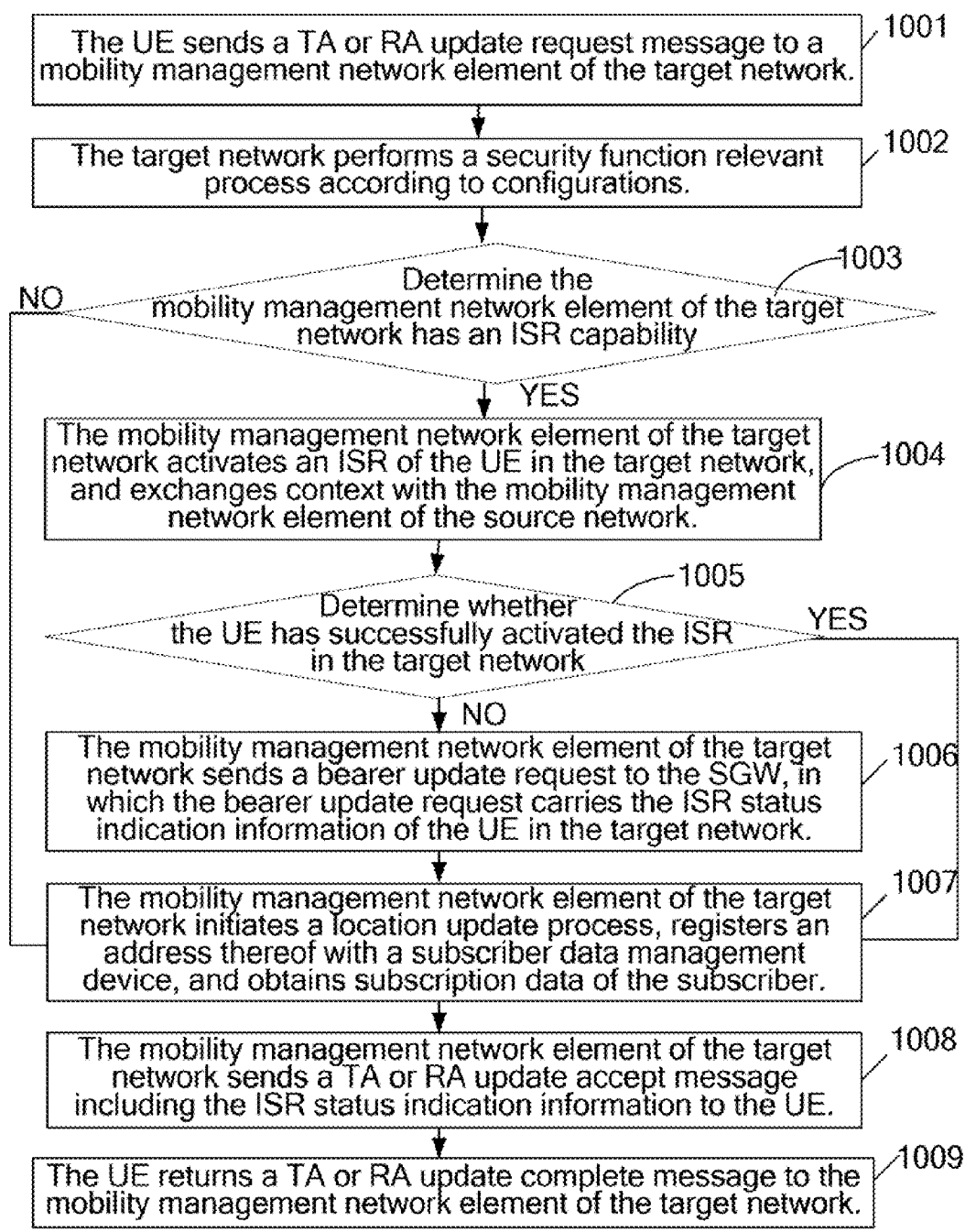
FIG. 10 is a flow chart of a method for ISR according to a tenth embodiment of the present invention.

FIG. 10 is a flow chart of a method for ISR according to a tenth embodiment of the present invention. Referring to FIG. 10, in a handover process, a source network is not required to provide ISR activation information of a subscriber in the source network, and as long as a target network supports the ISR, the target network can interact with the source network to activate the ISR.

Referring to FIG. 10, a specific ISR process in the RA or TA update procedure includes the following steps.

In Step 1001, a UE sends a TA or RA update request message to a mobility management network element of the target network.

In Step 1002, the target network performs a security function relevant process according to configurations.

In Step 1003, the mobility management network element of the target network determines whether the mobility management network element of the target network has an ISR capability; if yes, Step 1004 is performed; otherwise, Step 1007 is performed.

In Step 1004, the mobility management network element of the target network activates an ISR of the UE in the target network, and the mobility management network element of the target network interacts with a mobility management network element of the source network and exchanges about the respective ISR status indication information thereof.

Specifically, this step is described as follows.

1. The mobility management network element of the target network queries a DNS according to the TA identity or RA identity in the request message of the subscriber, obtains an address of a mobility management network element using a different access technology in the source network, and sends a context request to the mobility management network element in the source network.

If the handover before the TA or RA update process is a handover between different access technologies, the target network can directly use the address of the mobility management network element of the source network in the handover process. Alternatively, if the target network has obtained the address of the mobility management network element using the different access technology in the source network during the handover, that is, the mobility management network element using the same access technology in the source network includes such information in a forward handover request message sent to the mobility management network element of the target network, the target network may also directly use the address of the mobility management network element using the different access technology in the source network. Alternatively, when the security process is performed, the mobility management network element of the target network may interact with the mobility management network element using the same access technology in the source network to obtain the address of the mobility management network element using the different access technology at the source side along with the security vectors, and the target network directly uses the address.

2. The mobility management network element using the different access technology in the source network returns a context response message.

3. The mobility management network element of the target network returns a context acknowledgement message to the mobility management network element using the different access technology in the source network, in which the context acknowledgement message includes indication information indicating that the ISR of the UE in the target network has been activated.

The interaction process described in Steps 1 to 3 above is only one implementation, and the interaction in other modes may also be used to achieve the same objective. In addition, when the mobility management network element using the different access technology in the source network is not required to establish an association with the mobility management network element of the target network, Steps 1 to 3 may be omitted.

In Step 1005, the mobility management network element of the target network determines whether the UE has successfully activated the ISR in the target network; if yes, Step 1007 is performed; otherwise, Step 1006 is performed.

The manner for determining whether the UE has successfully activated the ISR in the target network specifically includes, but not limited to, the following manner.

In the interaction in Step 1004, if the mobility management network element of the source network returns indication information indicating that the source side supports the ISR or has activated the ISR, the target network determines that the ISR activation succeeds; otherwise, the target network determines that the ISR activation fails.

In Step 1006, the mobility management network element of the target network sends a bearer update request to the SGW, in which the bearer update request includes the ISR status indication information of the UE in the target network.

Specifically, the bearer update request sent by the mobility management network element of the target network may include the indication information indicating the ISR status of the UE in the target network to the SGW; alternatively, the request includes the corresponding ISR activation indication information only when the ISR status of the UE in the target network is activated, and otherwise, the request does not include the information. Thus, the SGW considers that the ISR status of the UE in the target network is activated only when the request includes the ISR activation indication information and the ISR activation indication information indicates that the ISR status of the UE is activated.

In Step 1007, the mobility management network element of the target network initiates a location update process, registers an address thereof with a subscriber data management device, and obtains subscription data of the subscriber.

In Step 1008, the mobility management network element of the target network sends a TA or RA update accept message including the ISR status indication information to the U E.

In Step 1009, the UE returns a TA or RA update complete message to the mobility management network element of the target network.

Figure 11A:
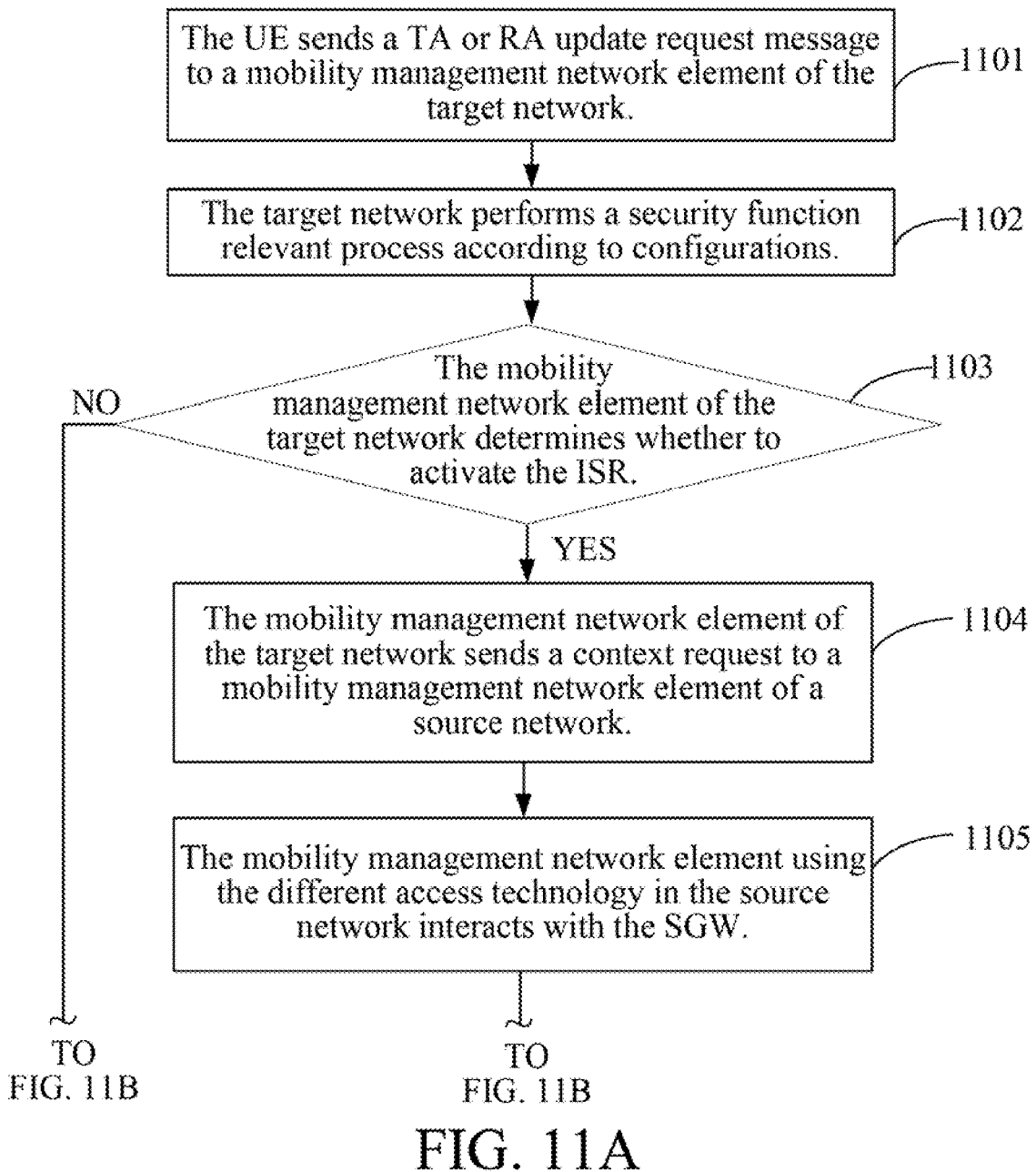
FIG. 11A-11B is a flow chart of a method for ISR according to an eleventh embodiment of the present invention.
Figure 11B:
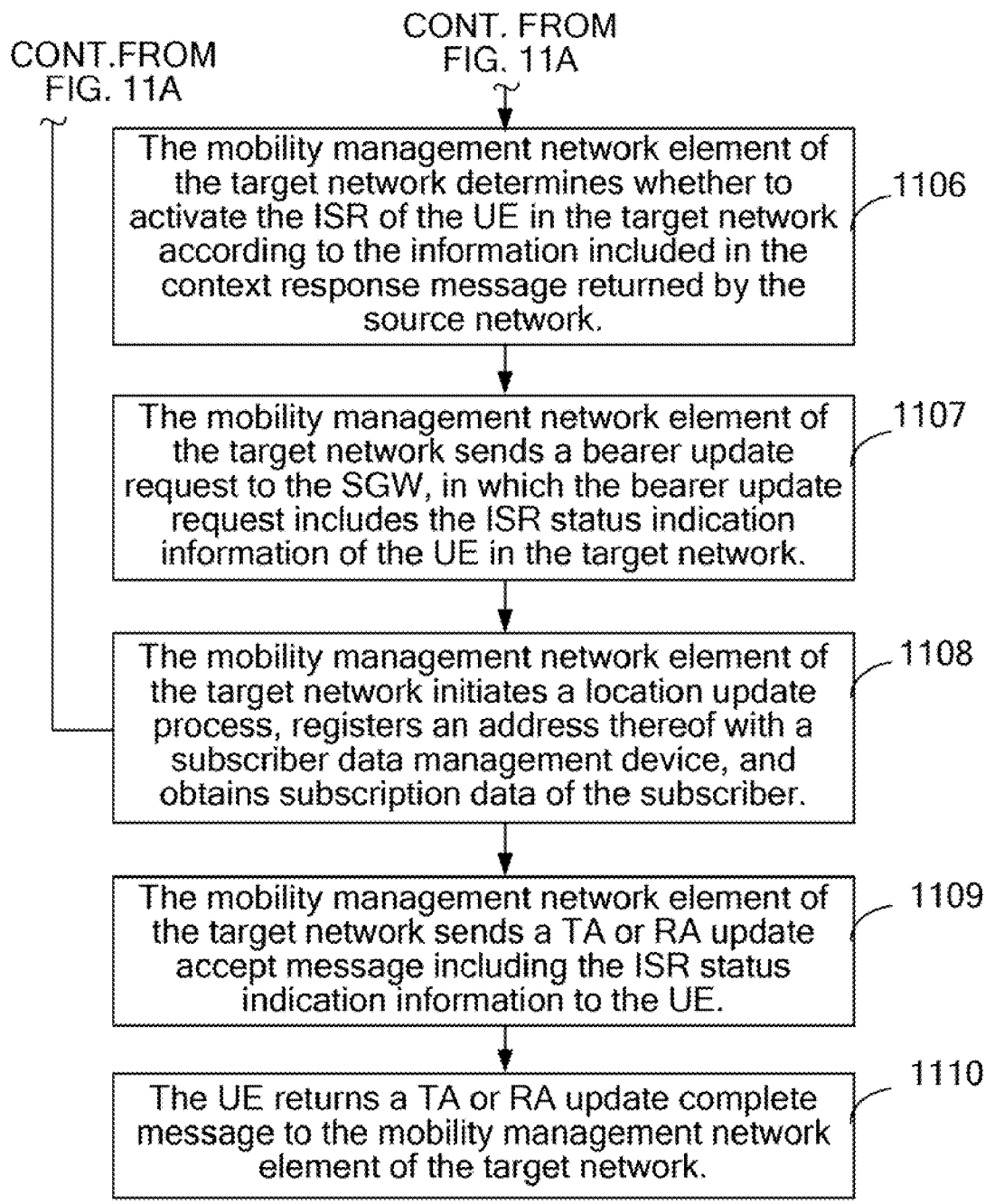

FIG. 11 is a flow chart of a method for ISR according to an eleventh embodiment of the present invention. In this embodiment, if a source network and a target network both have an ISR capability, a UE can activate an ISR after being handed over to the target network no matter whether the UE has activated the ISR in the source network.

Referring to FIG. 11, a specific ISR process in an RA or TA update process includes the following steps.

In Step 1101, the UE sends a TA or RA update request message to a mobility management network element of the target network.

In Step 1102, the target network performs a security function relevant process according to configurations.

In Step 1103, the mobility management network element of the target network determines whether it has the ISR capability; if yes, Step 1104 is performed; otherwise, Step 1108 is performed.

In Step 1104, the mobility management network element of the target network sends a context request message to a mobility management network element using a different access technology in the source network.

Before the mobility management network element of the target network sends the context request message to the mobility management network element using the different access technology in the source network, the following process is further included.

The mobility management network element of the target network queries a DNS according to the TA identity or RA identity in the request message of the subscriber, obtains an address of the mobility management network element using the different access technology in the source network, and sends a context request to the mobility management network element in the source network.

If the handover before the TA or RA update process is a handover between different access technologies, the target network can directly use the address of the mobility management network element using the different access technology in the source network during the handover process. Alternatively, if the target network has obtained the address of the mobility management network element using the different access technology in the source network during the handover, that is, the mobility management network element using the same access technology in the source network includes such information in a forward handover request message sent to the mobility management network element of the target network, the target network may also directly use the address of the mobility management network element using the different access technology in the source network. Alternatively, when the security process is performed, the mobility management network element of the target network may interact with the mobility management network element using the same access technology in the source network to obtain the address of the mobility management network element using the different access technology at the source side along with the security vectors, and the target network directly uses the address.

In Step 1105, the mobility management network element using the different access technology in the source network interacts with the SGW to notify the SGW to establish the ISR, and returns a context response message to the mobility management network element of the target network, in which the context response message includes an ISR activation result or status information of the mobility management network element using the different access technology in the source network; alternatively, the mobility management network element using the different access technology in the source network directly returns a context response message to the mobility management network element of the target network, in which the context response message includes information about resources for ISR activation allocated by the source network.

In Step 1106, the mobility management network element of the target network determines whether to activate the ISR of the UE in the target network according to the information included in the context response message returned by the source network. For example, if the message includes the information indicating that the ISR activation of the source network succeeds, or includes information about the resources for the ISR activation allocated by the source network, the mobility management network element of the target network determines to activate the ISR; otherwise, the mobility management network element of the target network determines not to activate the ISR.

The interaction described in Steps 1104 to 1106 is only one implementation, and the interaction in other modes may also be used to achieve the same objective.

In Step 1107, the mobility management network element of the target network sends a bearer update request to the SGW, in which the bearer update request includes the ISR status indication information of the UE in the target network. Specifically, the bearer update request sent by the mobility management network element of the target network may include the indication information indicating the ISR status of the UE in the target network to the SGW; alternatively, the bearer update request includes the corresponding ISR activation indication information only when the ISR status of the UE in the target network is activated, and otherwise, the request does not include the information. Thus, the SGW considers that the ISR status of the UE in the target network is activated only when the message includes the ISR activation indication information and the ISR activation indication information indicates that the ISR status of the UE is activated.

If the source network returns the information about the resources for the ISR activation allocated by the source network in Step 1105, the bearer update request includes the information.

In Step 1108, the mobility management network element of the target network initiates a location update process, registers an address thereof with a subscriber data management device, and obtains subscription data of the subscriber.

In Step 1109, the mobility management network element of the target network sends a TA or RA update accept message including the ISR status indication information to the UE.

In Step 1110, the UE returns a TA or RA update complete message to the mobility management network element of the target network.

Figure 12:
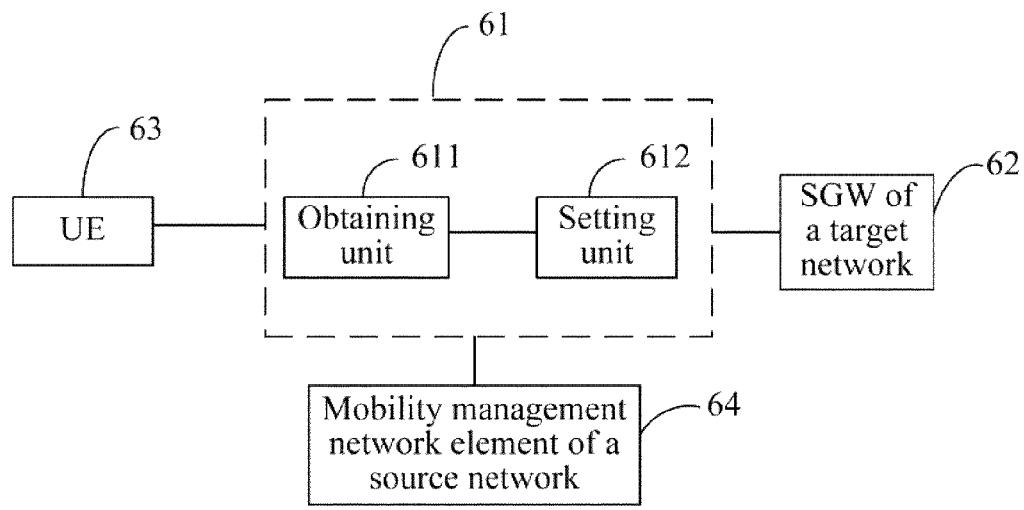
FIG. 12 is a structural view of a first embodiment of a system for ISR according to the present invention.

FIG. 12 is a structural view of a first embodiment of a system for ISR according to the present invention.

The system for ISR includes a mobility management network element 61 of a target network, a SGW 62 of the target network, a UE 63, and a mobility management network element 64 of a source network.

The UE 63 is configured to send a TA update request message or RA update request message including ISR activation information of the source network to the mobility management network element 61 of the target network.

The mobility management network element 61 of the target network is configured to obtain the ISR activation information of the source network from the UE 63, set an ISR status of the UE in the target network according to the obtained ISR activation information of the source network, and notify the set ISR status of the UE in the target network to the SGW 62 of the target network.

The mobility management network element may further include an obtaining unit 611 and a setting unit 612.

The obtaining unit 611 is configured to obtain the ISR activation information of the source network.

The obtaining unit may further include a UE obtaining unit.

The UE obtaining unit is configured to obtain the ISR activation information of the source network from the TA update request message or RA update request message sent by the UE.

The setting unit 612 is configured to set the ISR status of the UE in the target network according to the ISR activation information of the source network obtained by the obtaining unit 611, and notify the set ISR status of the UE in the target network to the SGW 62 of the target network.

The setting unit may further include a determining unit, an activating unit, and a notifying unit.

The determining unit is configured to determine whether the UE has activated the ISR in the source network and whether the mobility management network element has an ISR capability according to the ISR activation information of the source network obtained by the obtaining unit.

The activating unit is configured to activate the ISR of the UE in the target network when the determining unit determines that the UE has activated the ISR in the source network and the mobility management network element has the ISR capability.

The notifying unit is configured to notify an ISR status of the UE in the target network set by the activating unit to the SGW of the target network and/or the mobility management network element of the source network and/or the UE.

The setting unit may further include an indication message sending unit.

The indication message sending unit is configured to send a bearer update request message to the SGW of the target network if the mobility management network element of the target network has the ISR capability or determines to activate the ISR of the UE in the target network, in which the bearer update request message includes information indicating the SGW of the target network to maintain the current ISR status of a subscriber or information indicating that a current update process is a handover process.

The SGW 62 of the target network is configured to record the ISR status of the UE in the target network set by the mobility management network element 61 of the target network.

The mobility management network element 64 of the source network is configured to interact with the mobility management network element of the target network and exchange about the respective ISR status indication information thereof.

Figure 13:
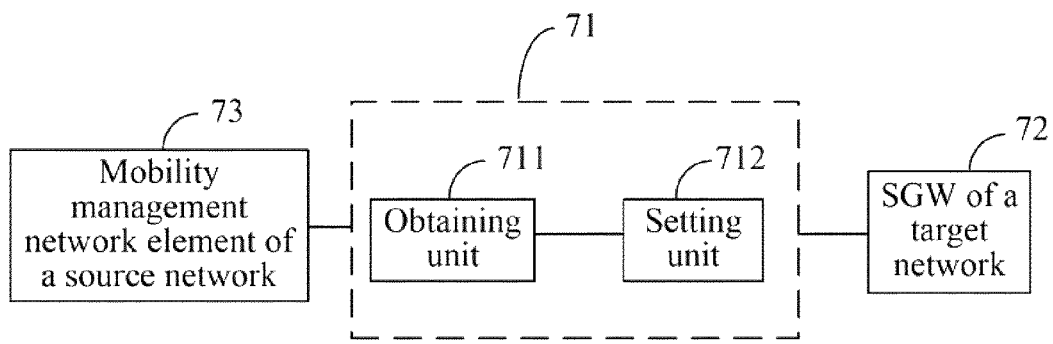
FIG. 13 is a structural view of a second embodiment of a system for ISR according to the present invention.

FIG. 13 is a structural view of a second embodiment of a system for ISR according to the present invention.

The system for ISR includes a mobility management network element 71 of a target network, a SGW 72 of the target network, and a mobility management network element 73 of a source network.

The mobility management network element 73 of the source network is configured to provide ISR activation information of the source network to the mobility management network element 71 of the target network.

The mobility management network element 71 of the target network is configured to obtain the ISR activation information of the source network from the mobility management network element 73 of the source network, set an ISR status of a UE in the target network according to the obtained ISR activation information of the source network, and notify the set ISR status of the UE in the target network to the SGW 72 of the target network and/or the mobility management network element of the source network and/or the UE.

The mobility management network element may further include an obtaining unit 711 and a setting unit 712.

The obtaining unit 711 is configured to obtain the ISR activation information of the source network.

The obtaining unit may further include a source network obtaining unit.

The source network obtaining unit is configured to obtain the ISR activation information of the source network from the source network.

The setting unit 712 is configured to set the ISR status of the UE in the target network according to the ISR activation information of the source network obtained by the obtaining unit 711, and notify the set ISR status of the UE in the target network to the SGW 72 of the target network and/or the mobility management network element 73 of the source network and/or the UE.

The setting unit may further include a determining unit, an activating unit, and a notifying unit.

The determining unit is configured to determine whether the source network has an ISR capability according to the ISR activation information of the source network obtained by the obtaining unit.

The activating unit is configured to activate the ISR of the UE in the target network when the determining unit determines that the source network has the ISR capability.

The notifying unit is configured to notify an ISR status of the UE in the target network set by the activating unit to the SGW of the target network and/or the mobility management network element of the source network and/or the UE.

The setting unit may further include an indication message sending unit.

The indication message sending unit is configured to send a bearer update request message to the SGW of the target network if the mobility management network element of the target network has the ISR capability or determines to activate the ISR of the UE in the target network, in which the bearer update request message includes information indicating the SGW of the target network to maintain the current ISR status of a subscriber or information indicating that a current update process is a handover process.

The SGW 72 of the target network is configured to record the ISR status of the UE in the target network set by the mobility management network element 71 of the target network.

In addition, in an embodiment, the present invention further provides a mobility management network element, which includes a determining unit, an activating unit, and a notifying unit.

The determining unit is configured to determine whether the mobility management network element of a target network has an ISR capability.

The activating unit is configured to activate an ISR of a UE in the target network when the determining unit determines that the mobility management network element of the target network has the ISR capability.

The notifying unit is configured to notify an ISR activation status or result of the UE in the target network to a mobility management network element of a source network.

The mobility management network element may further include an indication message sending unit.

The indication message sending unit is configured to send a bearer update request message to an SGW of the target network if the mobility management network element of the target network has the ISR capability or determines to activate the ISR of the UE in the target network, in which the bearer update request message includes information indicating the SGW of the target network to maintain the current ISR status of a subscriber or information indicating that a current update process is a handover process.

In addition, in an embodiment, the present invention further provides a mobility management network element, which includes a determining unit and an activating unit.

The determining unit is configured to determine whether to activate an ISR of a UE in a target network according to an ISR capability or an ISR activation status of a source network when the mobility management network element of the target network has the ISR capability.

The activating unit is configured to activate the ISR of the UE in the target network when the determining unit determines that the source network has the ISR capability or has activated the ISR.

The mobility management network element may further include an indication message sending unit.

The indication message sending unit is configured to send a bearer update request message to an SGW of the target network if the mobility management network element of the target network has the ISR capability or determines to activate the ISR of the UE in the target network, in which the bearer update request message includes information indicating the SGW of the target network to maintain the current ISR status of a subscriber or information indicating that a current update process is a handover process.

The mobility management network element may further include a notifying unit.

The notifying unit is configured to notify an ISR status of the UE in the target network set by the activating unit to the SGW of the target network and/or the mobility management network element of the source network and/or the UE.

In an embodiment, the present invention further provides a system for ISR. The system includes a mobility management network element of a target network and an SGW of the target network.

The mobility management network element of the target network is configured to provide an ISR capability of the mobility management network element of the target network.

The SGW of the target network is configured to control the mobility management network element of the target network to set an ISR status of a UE in the target network according to the ISR capability of the mobility management network element of the target network provided by the mobility management network element of the target network.

The SGW of the target network obtains the ISR capability of the mobility management network element of the target network from the user plane bearer update information sent by the mobility management network element of the target network Through the method for ISR and the system for ISR according to the embodiments of the present invention, the ISR status of the UE in the target network can be set according to the ISR activation information of the source network or the ISR capability of the mobility management network element of the target network. Thus, when the UE is handed over between networks, the ISR status of the UE can be processed.

A method for ISR and a system for ISR of the present invention are described in detail above. The specific examples provided in the specification are used to illustrate the principles and implementation of the present invention. The description about the embodiments of the present invention is helpful for understanding the technical solutions of the present invention. Persons of ordinary skill in the art can make variations and modifications to the present invention in terms of the specific implementations and application scopes according to the ideas of the present invention. Therefore, the specification shall not be construed as limitations to the present invention.

What is claimed is:

1. A method for idle mode signaling reduction (ISR), comprising:
    obtaining ISR activation information of a source network from a forward handover request message sent by a mobility management network element of the source network; and setting an ISR status of a user equipment (UE) in a target network according to the obtained ISR activation information of the source network.

2. The method according to claim 1, further comprising:
sending a bearer update request message to a serving gateway (SGW) of the target network, wherein the bearer update request message includes information indicating the SGW of the target network to maintain a current ISR status of a subscriber.

3. The method according to claim 2, further comprising:
including information in the bearer update request message to instruct the SGW of the target network to maintain the activated ISR status, and to reserve bearer information of a source network side and a target network side when the ISR is not activated.

4. The method according to claim 1, wherein the setting the ISR status of the UE in the target network according to the obtained ISR activation information of the source network comprises:
if a mobility management network element of the target network has an ISR capability, determining whether to activate the ISR of the UE in the target network according to the obtained ISR capability of the source network, and if yes, activating the ISR of the UE in the target network.

5. The method according to claim 1, wherein the setting the ISR status of the UE in the target network according to the obtained ISR activation information of the source network comprises:
determining, by a mobility management network element of the target network, whether the UE has activated the ISR in the source network, and if yes, determining whether the mobility management network element of the target network has an ISR capability, and if yes, activating the ISR of the UE in the target network.

6. The method according to claim 1, wherein the ISR activation information of the source network is indication information indicating that the ISR status of the UE in the source network is activated, and the setting the ISR status of the UE in the target network comprises:
activating the ISR of the UE in the target network.

7. The method according to claim 1, wherein the ISR activation information of the source network is indication information indicating that the source network has an ISR capability, and the setting the ISR status of the UE in the target network comprises:
activating the ISR of the UE in the target network.

8. The method according to claim 1, further comprising:
notifying the ISR status of the UE in the target network to an SGW of the target network.

9. The method for ISR according to claim 1, further comprising:
notifying the ISR status of the UE in the target network to the UE.

10. The method according to claim 1, further comprising:
sending, by a mobility management network element of the target network, a bearer update request message to an SGW of the target network if the mobility management network element of the target network has an ISR capability or determines to activate the ISR of the UE in the target network, wherein the bearer update request message includes indication information indicating the SGW of the target network to maintain the current ISR status of a subscriber or indication information indicating that a current update process is a handover process; and maintaining, by the SGW of the target network, the current ISR status of the subscriber unchanged according to the indication information.

11. The method according to claim 4, further comprising:
notifying, by the mobility management network element of the target network, an ISR activation status or result of the UE in the target network to the mobility management network element of the source network.

12. A method for idle mode signaling reduction (ISR), comprising:
determining whether to activate an ISR of a user equipment (UE) in a target network according to an ISR capability or an ISR activation status of a source network if a mobility management network element of the target network has an ISR capability, and
activating the ISR of the UE in the target network if the source network supports the ISR or has activated the ISR.

13. The method according to claim 12, wherein the method further comprises:
obtaining the ISR capability or the ISR activation status of the source network,
and wherein the obtaining the ISR capability or the ISR activation status of the source network comprises:
sending a request to a mobility management network element using a different access technology in the source network, and returning, by the mobility management network element using the different access technology in the source network, a response message, wherein the response message includes information about the ISR capability or the ISR activation status of the source network.

14. The method according to claim 12, further comprising:
sending, by the mobility management network element of the target network, a bearer update request message to a serving gateway (SGW) of the target network if the mobility management network element of the target network supports the ISR, wherein the bearer update request message includes indication information indicating the SGW of the target network to maintain a current ISR status of a subscriber or indication information indicating that a current update process is a handover process; and
maintaining, by the SGW of the target network, the current ISR status of the subscriber unchanged according to the indication information.

15. The method for ISR according to claim 12, further comprising:
notifying, by the mobility management network element of the target network, the ISR status of the UE in the target network to a mobility management network element of the source network and/or the SGW of the target network and/or the UE.

16. A system for idle mode signaling reduction (ISR), comprising:
a mobility management network element of a target network, configured to obtain ISR activation information of a source network from a forward handover request message sent by a mobility management network element of the source network, and set an ISR status of a user equipment (UE) in the target network according to the obtained ISR activation information of the source network; and
a serving gateway (SGW) of the target network, configured to record the ISR status of the UE in the target network set by the mobility management network element of the target network.

17. The system for ISR according to claim 16, further comprising:
a mobility management network element of the source network, configured to provide the ISR activation information of the source network to the mobility management network element of the target network.

18. A computer program product for providing mobility, the computer program product having a non-transitory computer readable medium with a computer program embodied thereon, the computer program comprising:
computer program code for obtaining idle mode signaling reduction (ISR) activation information of a source network from a forward handover request message sent by a mobility management network element of the source network; and
computer program code for setting an ISR status of a user equipment (UE) in a target network according to the ISR activation information of the source network obtained by the computer program code for obtaining.

19. The computer program product according to claim 18, wherein the computer program code for setting comprises:
computer program code for determining whether the UE has activated the ISR in the source network according to the ISR activation information of the source network obtained by the computer program code for obtaining and whether the mobility management network element has an ISR capability;
computer program code for activating the ISR of the UE in the target network when the computer program code for determining determines that the UE has activated the ISR in the source network and the mobility management network element has the ISR capability; and
computer program code for notifying an ISR status of the UE in the target network set by the computer program code for activating to a serving gateway (SGW) of the target network and/or a mobility management network element of the source network and/or the UE.

20. The computer program product according to claim 18, wherein the computer program code for setting comprises:
computer program code for determining whether the source network has an ISR capability according to the ISR activation information of the source network obtained by the computer program code for obtaining;
computer program code for activating the ISR of the UE in the target network when the computer program code for determining determines that the source network has the ISR capability; and
computer program code for notifying an ISR status of the UE in the target network set by the computer program code for activating to a serving gateway (SGW) of the target network and/or a mobility management network element of the source network and/or the UE.

21. The computer program product according to claim 19, wherein the computer program code for setting further comprises:
computer program code for sending a bearer update request message to the SGW of the target network if the mobility management network element of the target network has an ISR capability or determines to activate the ISR of the UE in the target network, wherein the bearer update request message includes information indicating the SGW of the target network to maintain a current ISR status of a subscriber or information indicating that a current update process is a handover process.

22. The computer program product according to claim 20, wherein the computer program code for setting further comprises:
computer program code for sending a bearer update request message to the SGW of the target network if the mobility management network element of the target network has an ISR capability or determines to activate the ISR of the UE in the target network, wherein the bearer update request message includes information indicating the SGW of the target network to maintain a current ISR status of a subscriber or information indicating that a current update process is a handover process.

23. The computer program product according to claim 18, wherein the mobility management network element is a mobility management entity (MME) or a serving general packet radio service support node (SGSN).

24. A computer program product for providing mobility, the computer program product having a non-transitory computer readable medium with a computer program embodied thereon, the computer program comprising:
computer program code for determining whether to activate an idle mode signaling reduction (ISR) of a user equipment (UE) in a target network according to an ISR capability or an ISR activation status of a source network when a mobility management network element of the target network has an ISR capability; and
computer program code for activating the ISR of the UE in the target network when the computer program code for determining determines that the source network has the ISR capability or has activated the ISR.

25. The computer program product according to claim 24, further comprising:
computer program code for sending a bearer update request message to a serving gateway (SGW) of the target network if the mobility management network element of the target network has the ISR capability or determines to activate the ISR of the UE in the target network, wherein the bearer update request message includes information indicating the SGW of the target network to maintain a current ISR status of a subscriber or information indicating that a current update process is a handover process.

26. The computer program product according to claim 24, further comprising:
computer program code for notifying an ISR status of the UE in the target network set by the computer program code for activating to a serving gateway (SGW) of the target network and/or a mobility management network element of the source network and/or the UE.

\* \* \* \* \*